US012528082B2

(12) United States Patent
Buser et al.

(10) Patent No.: US 12,528,082 B2
(45) Date of Patent: Jan. 20, 2026

(54) LATERAL FLOW-BASED SYSTEMS AND METHODS

(71) Applicant: University of Washington, Seattle, WA (US)

(72) Inventors: Joshua Buser, Seattle, WA (US); Joshua Bishop, Seattle, WA (US); Dylan Guelig, Seattle, WA (US); Arielle Howell, Seattle, WA (US); Sujatha Kumar, Seattle, WA (US); Paul Yager, Seattle, WA (US); Koji Abe, Seattle, WA (US); Erin Heiniger, Seattle, WA (US); Samantha Byrnes, Seattle, WA (US); Caitlin Anderson, Seattle, WA (US); Peter C. Kauffman, Seattle, WA (US); Maxwell Wheeler, Seattle, WA (US)

(73) Assignee: University of Washington, Seattle, WA (US)

( * ) Notice: Subject to any disclaimer, the term of this patent is extended or adjusted under 35 U.S.C. 154(b) by 1343 days.

(21) Appl. No.: 17/278,166

(22) PCT Filed: Oct. 1, 2019

(86) PCT No.: PCT/US2019/054126
§ 371 (c)(1),
(2) Date: Mar. 19, 2021

(87) PCT Pub. No.: WO2020/123016
PCT Pub. Date: Jun. 18, 2020

(65) Prior Publication Data
US 2021/0349087 A1 Nov. 11, 2021

Related U.S. Application Data

(60) Provisional application No. 62/739,720, filed on Oct. 1, 2018.

(51) Int. Cl.
*B01L 3/00* (2006.01)
*G01N 33/543* (2006.01)

(52) U.S. Cl.
CPC ....... *B01L 3/502738* (2013.01); *B01L 3/5023* (2013.01); *G01N 33/54306* (2013.01);
(Continued)

(58) Field of Classification Search
CPC .......... B01L 3/5023; B01L 2300/0825; B01L 2300/126; B01L 2400/0406;
(Continued)

(56) References Cited

U.S. PATENT DOCUMENTS 9,068,981 B2    6/2015   Babu et al.
9,108,196 B1    8/2015   Javadi et al.
(Continued)

FOREIGN PATENT DOCUMENTS

CN    101497017 A     8/2009
WO    2007/107743 A1  9/2007
(Continued)

OTHER PUBLICATIONS

PCT International Search Report and Written Opinion mailed Jul. 24, 2020, in corresponding PCT International Patent Application No. PCT/US2019/054126, filed Oct. 1, 2019, 13 pages.
(Continued)

*Primary Examiner* — Ann Montgomery
*Assistant Examiner* — Mckenzie A Dunn
(74) *Attorney, Agent, or Firm* — Christensen O'Connor Johnson Kindness, PLLC

(57) ABSTRACT

The present technology generally relates to stopped-flow microfluidic devices. Select embodiments of the present technology include microfluidic devices having a first porous element configured to receive a first fluid and a second porous element configured to receive a second fluid.
(Continued)

The second porous element can have one or more legs overlapping with the first porous element. The device can be configured such that (a) delivery of the first fluid to the first porous element causes the first fluid to flow along the length of the first porous element without substantially wetting the one or more legs, and (b) delivery of the second fluid to the second porous element causes the second fluid to flow into the overlapping regions of the first porous element, thereby substantially stopping flow of the first fluid along at least a portion of the first porous element.

22 Claims, 13 Drawing Sheets

(52) U.S. Cl.
CPC  *G01N 33/54313* (2013.01); *B01L 2300/0636* (2013.01); *B01L 2300/069* (2013.01); *B01L 2300/0825* (2013.01); *B01L 2300/126* (2013.01); *B01L 2400/0406* (2013.01)

(58) Field of Classification Search
CPC ....... B01L 3/502738; B01L 2300/0636; B01L 2300/069; G01N 33/54306; G01N 33/54313

See application file for complete search history.

(56) References Cited

U.S. PATENT DOCUMENTS

| | | |
|---|---|---|
| 9,341,624 B2 | 5/2016 | Siciliano et al. |
| 9,341,642 B1 | 5/2016 | Smith |
| 2008/0019866 A1 | 1/2008 | Paek et al. |
| 2011/0076697 A1 | 3/2011 | Ruvinsky et al. |
| 2011/0151578 A1 | 6/2011 | Abate et al. |
| 2016/0310942 A1 | 10/2016 | Yager et al. |

FOREIGN PATENT DOCUMENTS

| | | | |
|---|---|---|---|
| WO | 2013/158827 A1 | 10/2013 | |
| WO | WO-2014116756 A1 * | 7/2014 | ............ B01L 3/5023 |

OTHER PUBLICATIONS

Mclellan, J.S. et al., "Structural basis of respiratory syncytial virus neutralization by motavizumab," Nat Struct Mol Biol, 17(2):248-250, 2010.
Noyola, D.E. et al., "Effect of rapid diagnosis on management of influenza A infections," Pediatr Infect Dis J, 19(4):303-307, 2000.
Osborn, J.L. et al., "Microfluidics without pumps: reinventing the T-sensor and H-filter in paper networks," Lab on a Chip, 10(20):2659-2665, 2010.
Ovchinnikov, S. et al., "Large-scale determination of previously unsolved protein structures using evolutionary Information," eLife, 4:e09248, 2015.
Ovchinnikov, S. et al., "Protein Structure Determination using Metagenome sequence data," Science, 355(6322):294-298, epub Jan. 20, 2017, 2017.
Pastula, S.T. et al., "Hospitalizations for Respiratory Syncytial Virus Among Adults in the United States, 1997-2012," Open Forum Infect Dis, 4(1):ofw270, 2017.
Phillips, E. et al., Thermally actuated wax valves for paper-fluidic diagnostics, Lab on a Chip, 16:4230-4236, 2016.
Procko, E. et al., "A computationally designed inhibitor of an epstein-barr viral bcl-2 protein induces apoptosis in Infected cells," Cell, 157(7):1644-1656, 2014.
Ramachandran, S. et al., "Long-term dry storage of an enzyme-based reagent system for ELISA in point-of-care devices," Analyst, 139(6):1456-1462, 2014.

Rastogi, S. et al., "DNA detection on lateral flow test strips: enhanced signal sensitivity using LNA-conjugated gold nanoparticles," Chem Commun (Camb), 48(62):7714-7716, epub Aug. 11, 2012, 2012.
Spicar-Mihalic, P. et al., "CO2 laser cutting and ablative etching for the fabrication of paper-based devices," Journal of Micromechanics and Microengineering, 23(6):067003, 6 pages, 2013.
Strauch, E.M. et al., "Design of trimeric influenza neutralizing proteins targeting the hemagglutinin receptor binding site," Nature Biotechnology, 35(7):667-675, Jul. 2017.
Swanson, K.A. et al., "Structural basis for immunization with postfusion respiratory syncytial virus fusion F glycoprotein (RSV F) to elicit high neutralizing antibody titers," Proc Natl Acad Sci USA, 108(23):9619-9624, 2011.
Takakura, Y. et al., "Expression, purification, and immobilization of recombinant tamavidin 2 fusion proteins," Methods Mol Biol, 1177:95-106, 2014.
Toley, B.J. et al., "Isothermal strand displacement amplification (iSDA): a rapid and sensitive method of nucleic acid amplification for point-of-care diagnosis." Analyst, 140(22):7540-7549, 2015.
Toley, B.J. et al., "A versatile valving toolkit for automating fluidic operations in paper microfluidic devices," Lab Chip, 15(6):1432-1444, 2015.
Toley, B.J. et al., "Tunable-Delay Shunts for Paper Microfluidic Devices," Anal Chem, 85(23):11545-11552, 2013.
Whitehead, T.A. et al., "Optimization of affinity, specificity and function of designed influenza inhibitors using deep sequencing," Nat Biotechnol, 30(6):543-548, Epub May 29, 2012, 2012.
Zhu, Q. et al., "A highly potent extended half-life antibody as a potential RSV vaccine surrogate for all infants," Sci Transl Med, 9(388):eaaj1928, 11 pages, 2017.
Adler, M. et al., "Sensitivity by combination: immuno-PCR and related technologies." Analyst, 133(6):702-718, 2008.
Anderson, C. et al., "Rapid Diagnostic Assay for Intact Influenza Virus Using a High Affinity Hemagglutinin Binding Protein," Analytical Chemistry, 89(12):6609-6615, May 25, 2017.
Anderson, C., "Chapter Fourteen—Sensitive Protein Detection and Quantification in Paper-Based Microfluids for the Point of Care," Methods in Enzymology, 589:383-411, 2017.
Bandaranayake, A.D. et al., "Daedalus: a robust, turnkey platform for rapid production of decigram quantities of active recombinant proteins in human cell lines using novel lentiviral vectors," Nucleic Acids Res, 39(21):e143, 2011.
Bhardwaj, G. et al., "Accurate de novo design of hyperstable constrained peptides," Nature, 538(7625):329-335, 2016.
Buser, J. et al., "Chapter 8: Microfluidic diagnostics for low-resource settings: improving global health without a power cord," in Berg Avd, Segerink L, editors; Microfluidics for Medical Applications: RSC Press; pp. 151-190, 2015.
Buser, J.R. et al., "Precision chemical heating for diagnostic devices," Lab Chip, 15(23):4423-4432, 2015.
Buser, J.R. et al., "Electromechanical cell lysis using a portable audio device: enabling challenging sample preparation at the point-of-care," Lab Chip, 15(9):1994-1997, 2015.
Byrnes, S. et al., "Enabling lateral transport of genomic DNA through porous membranes for point-of-care applications," Analytical Methods, 9:3450-3463, Epub May 5, 2017, 2017.
Byrnes, S.A. et al., "One-step purification and concentration of DNA in porous membranes for point-of-care applications," Lab Chip, 15(12):2647-2659, 2015.
CDC, "Table 1. FDA-cleared RT-PCR Assays and Other Molecular Assays for Influenza Viruses," Available from: https://www.cdc.gov/flu/pdf/professionals/diagnosis/molecular-assay-table-1.pdf.
Chu, H.Y. et al., "Impact of rapid influenza PCR testing on hospitalization and antiviral use: A retrospective cohort study," J Med Virol, 87(12):2021-2026 ,2015.
Davis, I.W. et al., "Rosettaligand docking with full ligand and receptor flexibility," J Mol Biol, 385(2):381-392, 2009.
Demonte, D. et al., "Structure-based engineering of streptavidin monomer with a reduced biotin dissociation rate," Proteins, 81(9):1621-1633, 2013.
Dimaio, F. et al., "Modeling symmetric macromolecular structures in Rosetta3," PLoS One, 6(6):e20450, Epub Jul. 7, 2011, 2011.

(56) References Cited

OTHER PUBLICATIONS

Esquivel, J.P. et al., "Single-use paper-based hydrogen fuel cells for point-of-care diagnostic applications," J Power Sources, 342:442-451, 2017.
Fleishman, S.J. et al., "Hotspot-centric de novo design of protein binders," J Mol Biol, 413(5): 1047-1062, Epub Sep. 29, 2011.
Fleishman, S.J. et al., "Computational design of proteins targeting the conserved stem region of influenza hemagglutinin," Science, 332(6031):816-821, Epub May 14, 2011, 2011.
Fredriksson, S. et al., "Protein detection using proximity-dependent DNA ligation assays," Nature Biotechnology, 20:473-477, 2002.
Fridley, G.E. et al., "The evolution of nitrocellulose as a material for bioassays," MRS Bulletin, 38(04):326-330, 2013.
Fridley, G.E. et al., "Highly sensitive immunoassay based on controlled rehydration of patterned reagents in a 2-dimensional paper network," Anal Chem, 86(13):6447-6453, 2014.
Fridley, G.E. et al., "Controlled release of dry reagents in porous media for tunable temporal and spatial distribution upon rehydration," Lab on a Chip, 12(21):4321-4327, 2012.
Friedman, D. et al., "Respiratory syncytial virus hospitalization risk in the second year of life by specific congenital heart disease diagnoses," Plos One, 12(3):e0172512, Epub Mar. 2, 2017, 2017.
Fu, E. et al., "Two-Dimensional Paper Network Format That Enables Simple Multistep Assays for Use in Low- Resource Settings in the Context of Malaria Antigen Detection," Analytical Chemistry, 84(10):4574-4579, 2012.
Fu, E. et al., "Chemical signal amplification in two-dimensional paper networks," Sens Actuator B-Chem, 149(1):325-328, 2010.
Fu, E. et al., "Enhanced Sensitivity of Lateral Flow Tests Using a Two-Dimensional Paper Network Format," Analytical Chemistry, 83(20):7941-7946, 2011.
Fu, E. et al., "Controlled reagent transport in disposable 2D paper networks," Lab on a Chip, 10(7):918-920, 2010.
Fu, E.L. et al., "Transport in two-dimensional paper networks," Microfluidics and Nanofluidics, 10(1):29-35, 2011.
Fullerton, S.W. et al., "Mechanism of the Class I KDPG aldolase," Bioorg Med Chem, 14(9):3002-3010, 2006.
Greenwood, C. et al., "Proximity assays for sensitive quantification of proteins," Biomolecular Detection and Quantification, 4:10-16, 2015.
Gullberg, M. et al., "Cytokine detection by antibody-based proximity ligation," PNAS, 101(22):8420-8424, 2004.
Harper, S.A. et al., Expert Panel of the Infectious Diseases Society of A."Seasonal influenza in adults and children-diagnosis, treatment, chemoprophylaxis, and institutional outbreak management: clinical, practice guidelines of the Infectious Diseases Society of America," Clin Infect Dis, 48(8):1003-1032, 2009.
Holstein, C. et al., "Immobilizing affinity proteins to nitrocellulose: a toolbox for paper-based assay developers," Anal Bioanal Chem, 408:1335-1346, 2016.
Huang, P.S. et al., "RosettaRemodel: A generalized framework for flexible backbone protein design," PLoS One, 6(8):e24109, Epub Sep. 13, 2011, 2011.
Huang, P.S. et al., "High thermodynamic stability of parametrically designed helical bundles," Science, 346(6208):481-485, 2014.
Huang, S. et al., "Disposable autonomous device for rapid swab-to-result diagnosis of influenza," Analytical Chemistry, doi: 10.1021/acs.analchem.6b04801, Analytical Chemistry, 89:5776-5783, Epub May 8, 2017, 2017.
Jung, Y. et al., "Self-directed and self-oriented immobilization of antibody by protein G-DNA conjugate," Anal Chem, 79(17):6534-6541, Epub Aug. 2, 2007, 2007.
Kauffman, P. et al., "Visualization and measurement of flow in two-dimensional paper networks," Lab on a Chip, 10(19):2614-2617, 2010.
Klein, J.C. et al., "Multiplex pairwise assembly of array-derived DNA oligonucleotides," Nucleic Acids Res, 44(5):343, epub Nov. 8, 2015, 2016.
Koday, M.T. et al., "A Computationally Designed Hemagglutinin Stem-Binding Protein Provides In Vivo Protection from Influenza Independent of a Host Immune Response," PLoS Pathog, 12(2):e1005409, 2016.
Koga, N. et al., "Principles for designing ideal protein structures," Nature, 491(7423):222-227, 2012.
Lafleur, L. et al., "Progress toward multiplexed sample-to-result detection in low resource settings using microfluidic Immunoassay cards," Lab on a Chip, 12(6):1119-1127, 2012.
Lafleur, L.K. et al., "A rapid, instrument-free, sample-to-result nucleic acid amplification test," Lab Chip, 16(19):3777-3787, 2016.
Li, L. et al., "Structural analysis and optimization of the covalent association between SpyCatcher and a peptide Tag," J Mol Biol, 426(2):309-317, 2014.
Liljeroos, L. et al., "Architecture of respiratory syncytial virus revealed by electron cryotomography," Proc Natl Acad Sci USA, 110(27):11133-11138, 2013.
Lim, K.H. et al., "Stable, high-affinity streptavidin monomer for protein labeling and monovalent biotin detection," Biotechnol Bioeng, 110(1):57-67, 2013.
Lin, Y.R. et al., "Control over overall shape and size in de novo designed proteins," Proc Natl Acad Sci USA, 112(40):E5478-5485, 2015.
Lutz, B. et al., "Dissolvable fluidic time delays for programming multi-step assays in instrument free paper diagnostics," Lab on a Chip, 13(14):2840-2847, 2013.
Lutz, B.R. et al., "Two-dimensional paper networks: programmable fluidic disconnects for multistep processes in shaped paper," Lab on a Chip, 11(24):4274-4278, 2011.
Mclellan, J.S. et al., "Structure of respiratory syncytial virus fusion glycoprotein in the postfusion conformation reveals preservation of neutralizing epitopes," J Virol, 85(15):7788-7796, 2011.

* cited by examiner

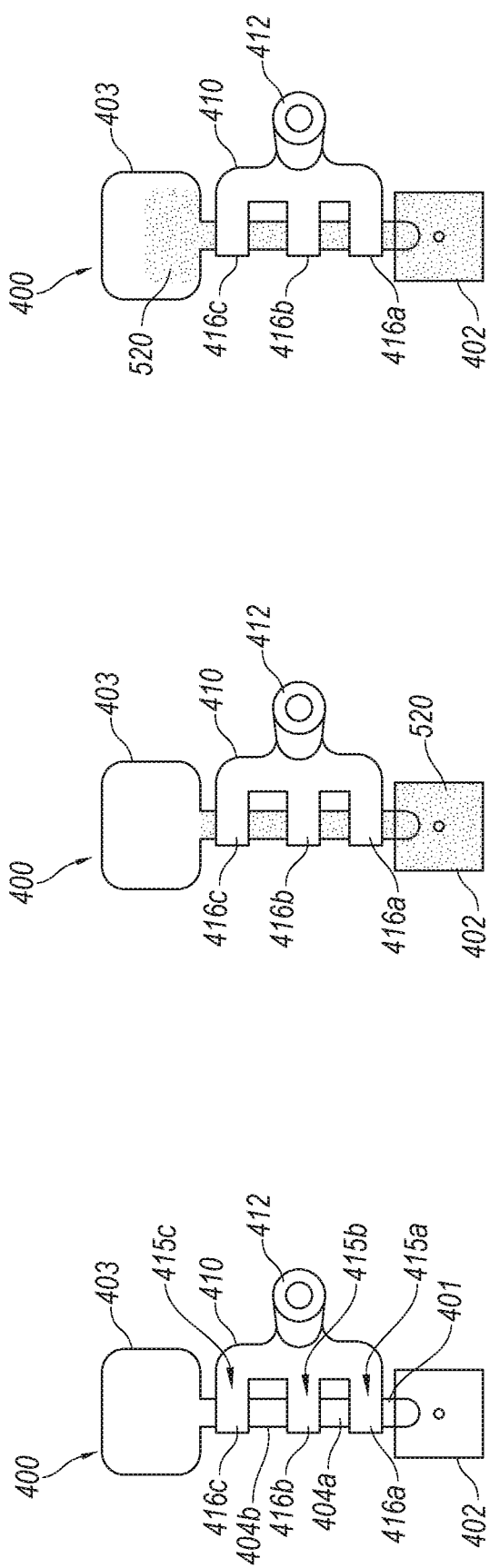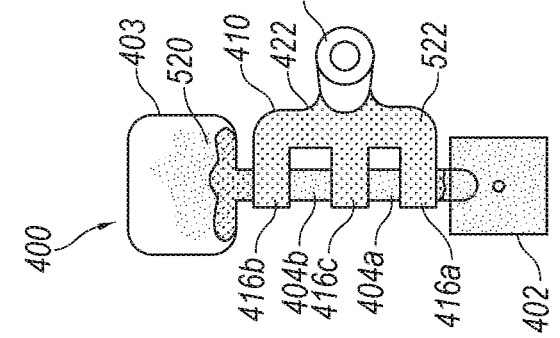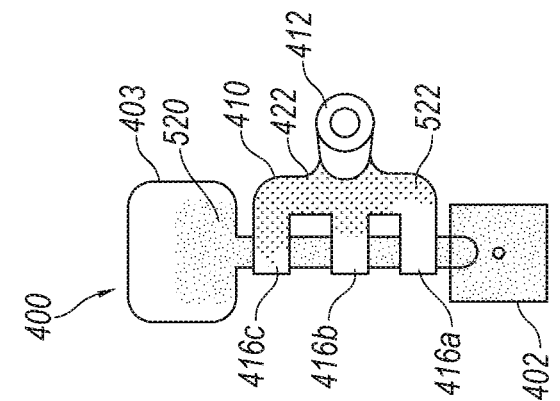

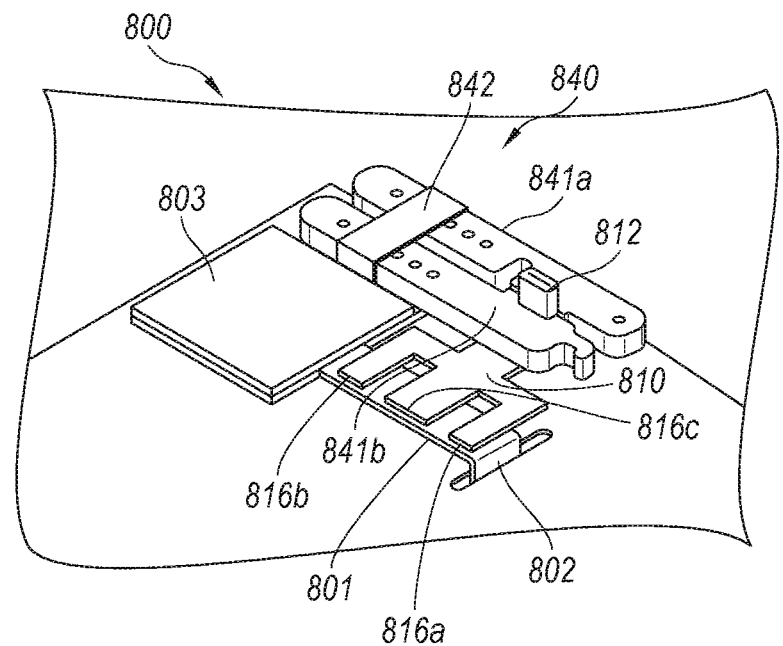
Fig. 8A
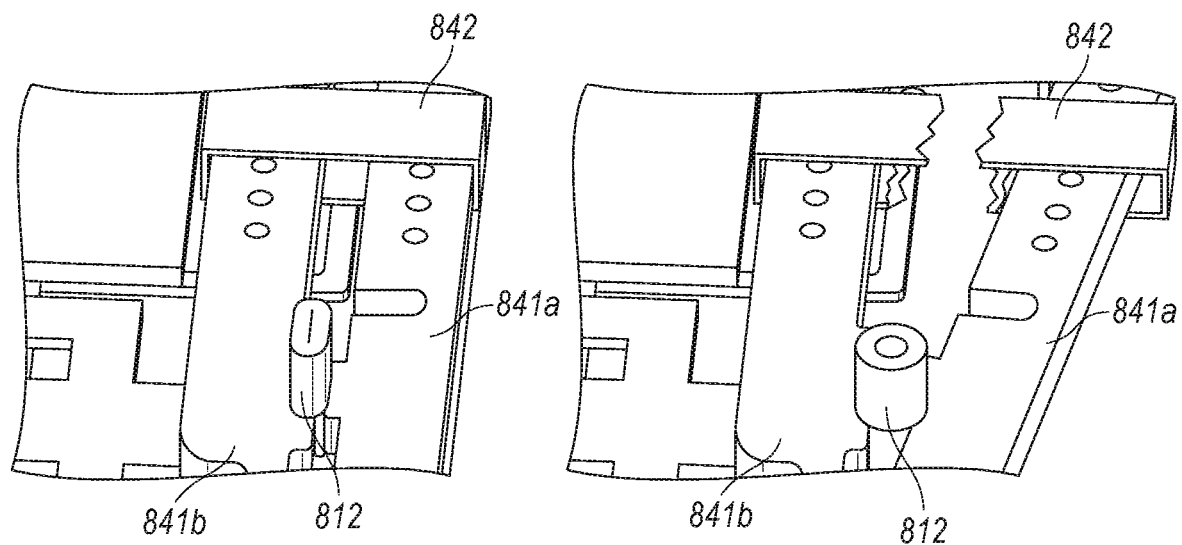
Fig. 8B
Fig. 8C

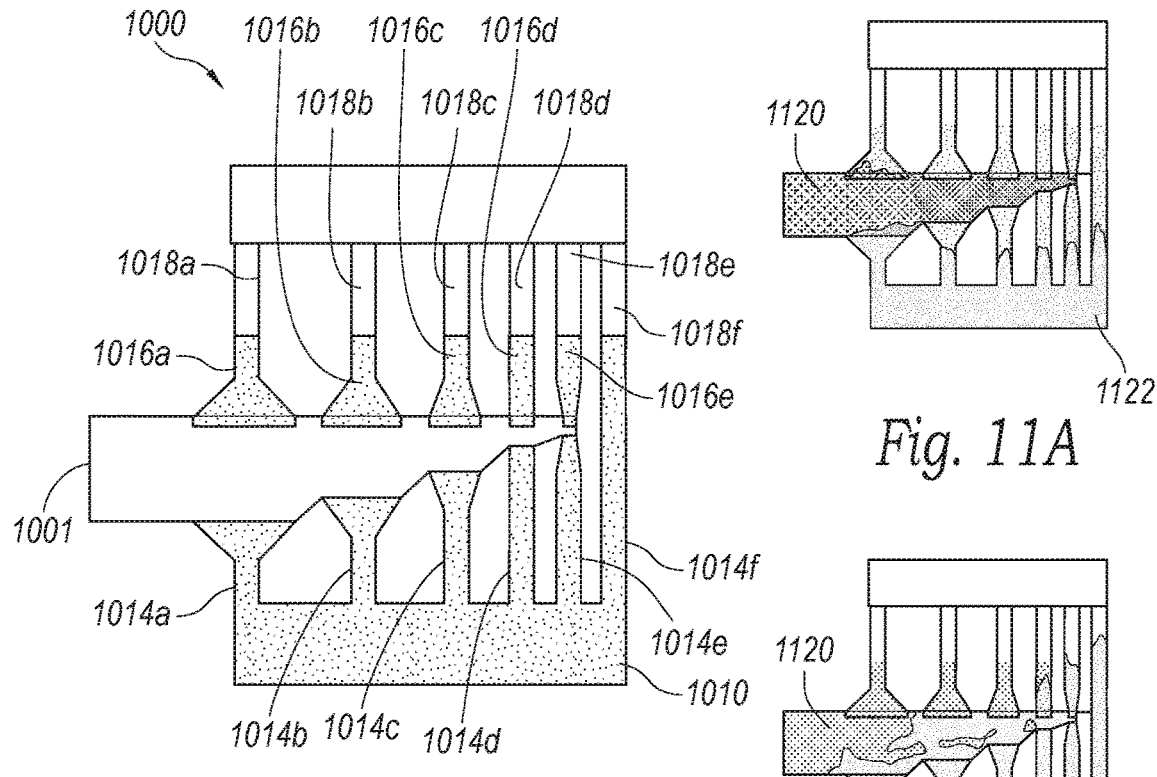
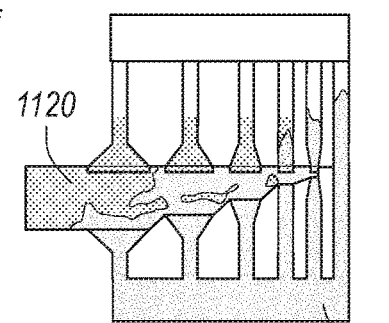
Fig. 11A
Fig. 11B
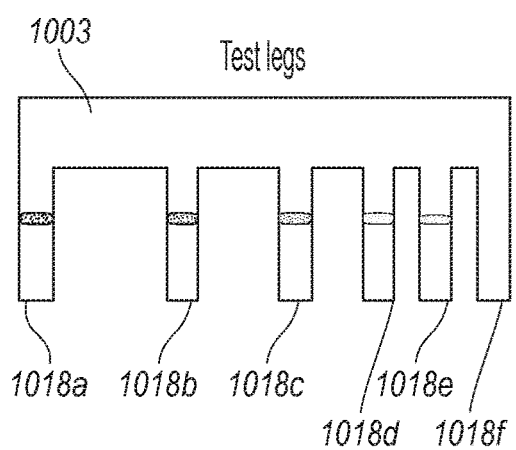
Fig. 10
Fig. 11C
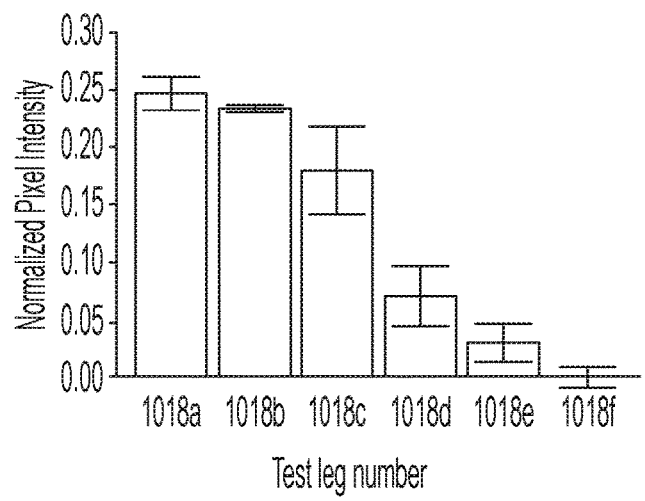
Fig. 11D

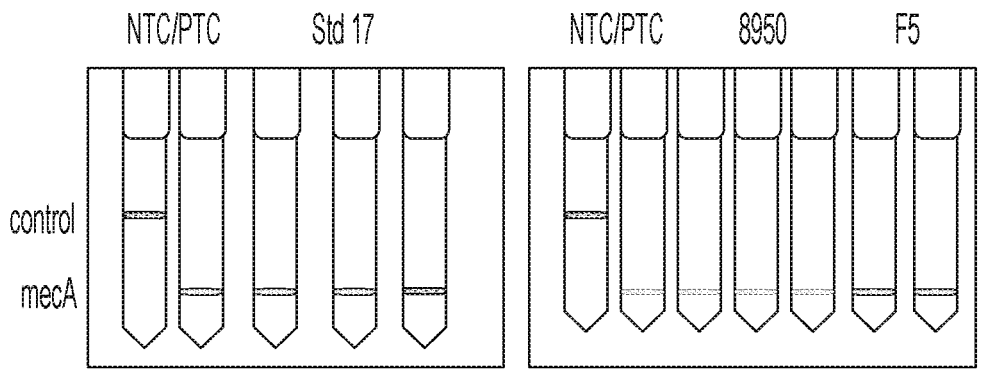
*Fig. 12*
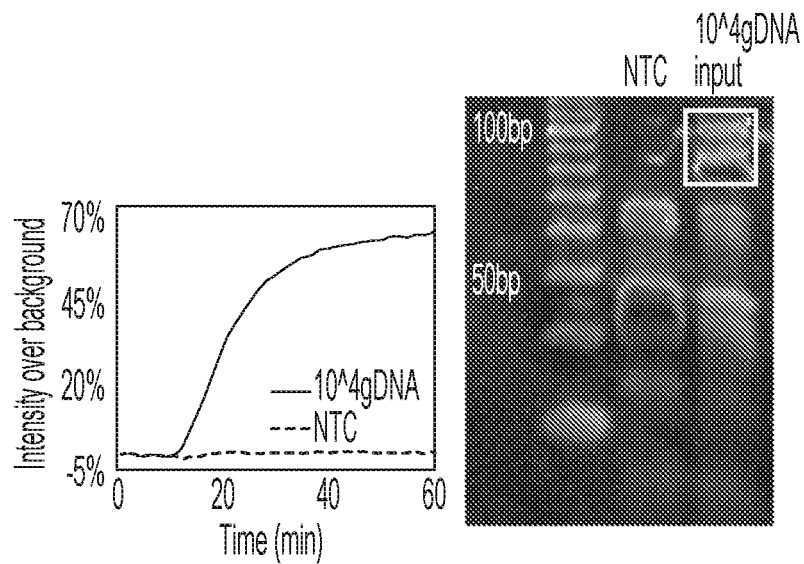
*Fig. 13*
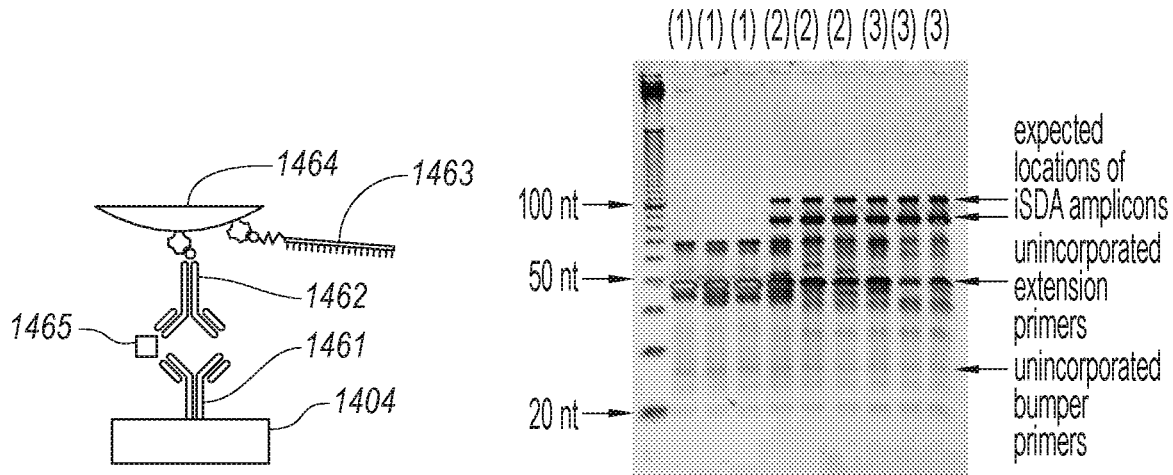
*Fig. 14*
*Fig. 15*

LATERAL FLOW-BASED SYSTEMS AND METHODS

CROSS-REFERENCE TO RELATED APPLICATIONS

The present application is a National Phase of International Patent Application No. PCT/US2019/054126, filed Oct. 1, 2019, which claims the benefit of U.S. Provisional Patent Application No. 62/739,720, titled "DEVICES AND METHODS FOR STOPPED FLOW AMPLIFICATION IN LATERAL FLOW-BASED SYSTEMS," filed Oct. 1, 2018, the disclosures of which are hereby incorporated by reference in their entireties.

STATEMENT REGARDING FEDERALLY SPONSORED RESEARCH

This invention was made with government support under Grant No. HDTRA1-16-C-0029, awarded by the Defense Threat Reduction Agency. The government has certain rights in the invention.

TECHNICAL FIELD

The present technology is generally related to microfluidic lateral flow devices and associated systems and methods. In particular, several embodiments of the present technology are directed toward stopped-flow lateral flow-based systems, including stopped-flow lateral flow-based systems for amplification and detection of a target molecule.

BACKGROUND

Paper-microfluidic devices such as lateral flow strip tests ("LFT" or "LFTs") have been identified as a diagnostic technology well-suited for point-of-care ("POC") use in low resource settings. With fluid transport occurring due to the capillary pressure of the strip material (rather than through the use of pumps), LFTs are entirely disposable, rapid, user-friendly, and affordable. Numerous LFTs have been developed and successfully used in limited-resource settings, with applications including pregnancy testing and disease diagnosis. The basic function of a LFT is to mix a substance of interest (e.g., an analyte) with a visible label (e.g., antibodies conjugated to gold nanoparticles) and capture the analyte-label complex at a detection line via an immobilized capture molecule (e.g., antibody). While the simplicity of LFTs makes them ideal for use as a POC tool, it has generally limited them to performing tests that can be carried out in a single chemical step. Moreover, the use of LFTs as a clinically relevant diagnostic tool can be limited to targets with high(er) concentrations because of limited analytical sensitivity of the LFT format.

Porous membranes are often used in conventional LFTs and flow-through cartridges. As such, flow of fluid through the LFT usually occurs by wicking through a membrane (either laterally or transversely) onto an absorbent pad. Immunoassays take advantage of such porous membrane systems to measure and analyze analyte samples. The dependence on wicking to generate flow greatly limits control over assay conditions. Specifically, lateral flow assays are often limited to a single step in which the sample (and buffer) is added to the sample pad, and the sample flows by capillary action (i.e., wicking) along the pad. Capillarity provides the force needed to flow fluid from one point to another, causing reagents stored in dry form to be transported along the device and to pass over regions that contain immobilized capture molecules. These devices are typically restricted to simple one-shot detection chemistries like colored nanoparticles that do not provide the sensitivity possible with multistep-detection chemistries, such as enzymatic amplification. They are also rarely quantitative.

Microfluidic systems that include open fluid channels for the flow of buffers, samples, and reagents can inherently be made much more sophisticated, and it is possible to use them to carry out a very large number of fluid-processing steps. Such microfluidic systems usually incorporate a complex disposable, which leads to unavoidably high per-test manufacturing costs and the need for expensive external pumps and valves to move fluids. While such microfluidic devices can inherently be very flexible in the functions that they perform, they are also inherently complicated and expensive. Additionally, the devices that have been made that support complex function are usually quite complex themselves. For example, some polymeric laminate cartridges currently developed contain as many as 23 different layers, each of which must be separately manufactured and bonded to the others.

BRIEF DESCRIPTION OF THE DRAWINGS

FIGS. 5A-5E are time-lapse views of the microfluidic device of FIG. 4 during various stages of fluid delivery in accordance with select embodiments of the present technology.

FIGS. 8A-8C illustrate a stopped-flow microfluidic device with an automated fluid release mechanism configured in accordance with select embodiments of the present technology.

FIG. 10 illustrates a microfluidic device for performing multiple dilutions of a biological sample and configured in accordance with select embodiments of the present technology.

FIGS. 11A-D illustrate the results of diluting a sample using the microfluidic device of FIG. 10 in accordance with select embodiments of the present technology.

FIG. 12 illustrates the amplification of nucleic acids on select materials for use with devices configured in accordance with select embodiments of the present technology.

FIG. 13 illustrates the real-time amplification results of nucleic acids flowing through a lyophilized reagent mixture following rehydration of the reagent mixture in accordance with select embodiments of the present technology.

FIG. 14 is a schematic illustration of an assay stack for use with devices configured in accordance with select embodiments of the present technology.

FIG. 15 is an image of the polyacrylamide gel electrophoresis (PAGE) results following in-tube isothermal strand displacement amplification of a nucleic acid sample in accordance with select embodiments of the present technology.

DETAILED DESCRIPTION

Figure 1A:
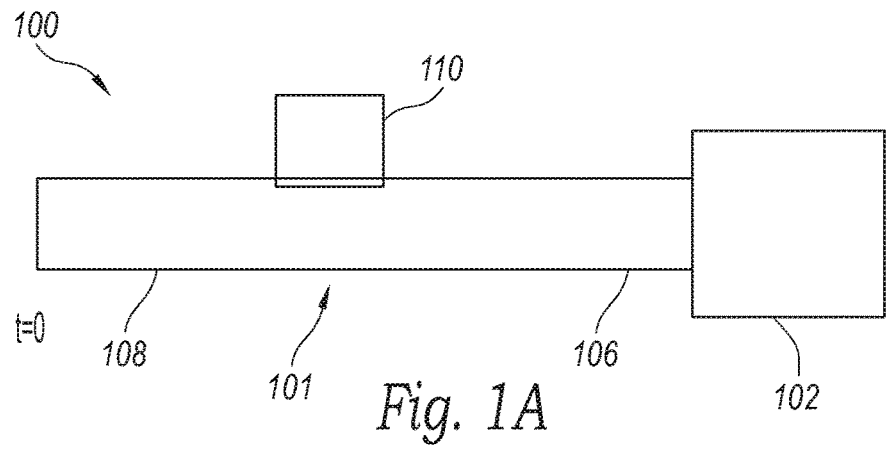
FIGS. 1A-1G illustrate flow of a fluid having a partially saturated wetting front through a microfluidic device configured in accordance with select embodiments of the present technology.

The present technology generally relates to paper-microfluidic devices and methods of using such devices. For example, select embodiments of the present technology provide microfluidic devices capable of stopping the flow of a sample fluid along at least a portion of a first wicking membrane. As will be described in detail herein, stopping flow along the wicking membrane can be advantageous for numerous reasons. For example, stopping flow can permit amplification of a target molecule and/or enhance detection of the target molecule. Accordingly, the present technology also provides systems and methods for stopped flow amplification and/or target identification in a paper-microfluidic device. Additional embodiments of the present technology provide microfluidic devices that automate multiple parallel dilutions of a sample preparation including a biological sample.

Previous attempts to develop microfluidic devices for complex assay procedures reduced and/or eliminated many of the advantages of conventional lateral flow devices (e.g., low cost, reduced complexity, automation, etc.). For example, automation of more complex assay procedures required new fluidic controls using a variety of valving techniques. However, materials embedded into a membrane to act as valves can slow or delay flow and interfere with the intended purpose of the device itself. For example, patterned wax at various concentrations can be used to control fluidic timing in porous devices. Another example is embedded sugar barriers within porous materials. A fluidic diode using a combination of hydrophobic and hydrophilic coatings can also be used to control direction and sequencing of fluid flow. However, many of these systems introduce an additional reagent (wax, sugar, etc.) into the reaction, which may negatively impact sensitive reactions such as nucleic acid amplification.

A number of attempts have been made at implementing valve technologies that do not introduce outside agents into the assay fluids. For example, permanent magnets and electromagnetic solenoids, which are elements outside of the main fluid pathway, have been tested with various devices. Valves that use auxiliary fluidic networks to actuate expanding elements can turn flow on or off and cause fluid diversion and redirection. More complex switching has also been demonstrated using paper actuators, including both normally-on and normally-off single- and/or double-throw switches. Methods for the sequential timed delivery of reagents through two-dimensional paper networks that rely on volume metering have also been designed. Although somewhat effective, many of these systems are limited to use with a maximum of a few hundred microliters of input sample. When processing urine or dilute blood, devices may need to manage up to 5-10 mL of sample. In urine, for example, the first 10 mL often contains the highest concentration of pathogen biomarkers. Due to the diluted nature of urine, at least 1-2 mL is often collected to obtain detectable pathogen at clinically relevant concentrations. Recently, isotachophoresis has been used to concentrate pathogen biomarkers from complex samples, but these systems often use small sample volumes and involve multiple pre-processing steps, such as off-device centrifugation and sample dilution. Additionally, isotachophoresis can be sensitive to salt and cell concentrations found in clinical samples. An integrated method for paper-based nucleic acid extraction coupled to in-membrane isothermal amplification to detect *chlamydia* was also developed and, although somewhat effective, this device required multiple user steps and accepted a limited volume of urine (e.g., between 10-100 µL of urine). An in-membrane sample processing method for concentrating DNA (e.g., up to 2 mL of sample) could also be used, but such a system did not include any automation to enable development of an integrated device.

In contrast with conventional microfluidic devices, embodiments of the present technology provide lateral flow devices that are expected to effectively automate complex chemical processes. For example, the present technology can be applied to create microfluidic devices that, among other things, can (1) automate DNA extraction and concentration from mL-sized samples and, (2) automate multiple parallel dilutions in a paper-microfluidic device.

For example, one embodiment of the present technology provides a stopped-flow microfluidic device for selectively retaining and amplifying a target molecule in a biological sample. The microfluidic device includes a first membrane element having a first end region, a second end region, and a flow region extending between the first end region and the second end region. The first end region can be configured to receive a first fluid. The device further includes a second membrane element having a fluid input region and one or more legs extending from the fluid input region. Each of the one or more legs is coupled to (a) the fluid input region and (b) the flow region of the first membrane element. The device can further optionally include a fluid port in fluid communication with the fluid input region of the second membrane element and configured to receive a second fluid. The device is configured such that delivery of the first fluid to the first end region of the first membrane element causes the first fluid to flow from the first end region of the first membrane element to the second end region of the first membrane element via the flow region without substantially wetting the one or more legs. The device is further configured such that delivery of the second fluid to the fluid port causes the second fluid to flow through (a) the fluid input region, (b) the one or more legs, and (c) at least partially into the flow region of the first membrane element, wherein flow of the second fluid into the flow region changes a flow pressure exerted on the first fluid, thereby substantially stopping flow of the first fluid along at least a portion of the flow region.

Another embodiment of the present technology provides a stopped-flow microfluidic device for selectively retaining and amplifying a target molecule in a biological sample. The stopped-flow microfluidic device can include a first porous element can have a first end region, a second end region, and a flow region extending between the first end region and the second end region. The first end region is configured to receive a first fluid containing the biological sample. The first porous element is configured to permit flow of the first fluid through the flow region and towards the second end region. A capture zone can be positioned along the flow region to selectively retain target components included in the first fluid. The device can also include a second porous element having a fluid input region and one or more legs extending from the fluid input region and overlapping with distinct portions of the flow region of the first porous element. The fluid input region can be configured to receive a second fluid, and each of the one or more legs can be configured to deliver the second fluid to one or more sections of the flow region to at least partially stop flow of the first fluid along a segment of the flow region.

The terminology used in the description presented below is intended to be interpreted in its broadest reasonable manner, even though it is being used in conjunction with a detailed description of certain specific embodiments of the present technology. Certain terms may even be emphasized below; however, any terminology intended to be interpreted in any restricted manner will be overtly and specifically defined as such in this Detailed Description section. Additionally, the present technology can include other embodiments that are within the scope of the claims but are not described in detail with respect to FIGS. 1A-18.

Reference throughout this specification to "one embodiment" or "an embodiment" means that a particular feature, structure or characteristic described in connection with the embodiment is included in at least one embodiment of the present technology. Thus, the appearances of the phrases "in one embodiment" or "in an embodiment" in various places throughout this specification are not necessarily all referring to the same embodiment. Furthermore, the particular features or characteristics may be combined in any suitable manner in one or more embodiments.

Reference throughout this specification to relative terms such as, for example, "substantially," "approximately," and "about" are used herein to mean the stated value plus or minus 10%.

The headings provided herein are for convenience only and do not interpret the scope or meaning of the claimed present technology.

I. Definitions

As used herein, "porous element" or "porous membrane" refers to a porous membrane (e.g., a wick, pathway, leg, pad, delivery channel, etc.) through which fluid can travel by capillary action, such as paper, nitrocellulose, nylon, glass fiber, and the like. Unless the context clearly requires otherwise, a porous element can be two-dimensional or three-dimensional (when considering its height in addition to its length and width). Additionally, a porous membrane can be a single layer or may comprise two or more membranous layers. Although in some embodiments a specific term may be used (e.g., "wick," "pathway," "leg," "pad," "delivery channel," etc.), it should be understood that use of a different porous element is also within the scope of the present technology.

As used herein, "wettably distinct" means being capable of being wetted by contact with separate fluids without mixing of the fluids at the point of initial wetting. For example, two input legs are wettably distinct if they are physically separated so that each leg could be brought into contact with a separate fluid reservoir. Pathways can be made wettably distinct by a variety of means including, but not limited to, separation via distinct edges (e.g., cut as separate pathways) and separation via an impermeable barrier.

II. Fluid Flow Using Partial Saturation

Porous materials enable affordable diagnostic devices (e.g., lateral flow tests) in part because they automatically transport fluids, removing the need for expensive operational equipment such as syringe pumps. In general, paper-microfluidic systems are complex, multi-material porous networks in which fluid transport is driven by material properties, and by saturation and pressure differentials at the junction of overlapping materials. However, previous descriptions of fluid transport in paper-microfluidic systems assume a single-material, single-dimensional system and a fully saturating wetting front. For example, the use of Washburn's equation to model flow characteristics assumes the device comprises a single material, while the use of Darcy's law to model flow characteristics assumes a fully saturating wetting front. Both assumptions can be incorrect in more complex microfluidic systems. Accordingly, current modelling techniques fail to accurately predict flow through complex systems comprising multiple materials, multiple dimensions, and or partially saturated wetting fronts.

The assumption that the wetting front in paper-microfluidic systems is fully saturating is particularly problematic. In some embodiments, porous membranes support a partially-saturated wetting front, where the degree of saturation depends on (a) specific physical properties of the membrane, (b) fluid properties, and (c) system geometry. More advanced paper-microfluidic systems become possible when partial saturation is exploited. Such complex systems such as those described herein can be more accurately modelled with the Richards equation, which was originally developed to describe partially saturated fluid transport in hydrogeological systems. More specifically, the Richards equation (Equation 1) models the change in saturation of a porous media due to gradients in the pressure head:

$$\frac{\partial \theta}{\partial t} = \frac{\partial}{\partial z}\left[K(\theta)\frac{\partial H(\theta)}{dz}\right] \quad (1)$$

In Equation (1), $\theta$ is the volumetric water content, t is time, K is the hydraulic conductivity, H is the pressure head, and z is the position. Both the hydraulic conductivity K and pressure H are functions of volumetric water content $\theta$: as the porous media becomes more saturated, it generates less suction pressure and becomes a better fluid conductor.

FIGS. 1A-1G provide an example of a paper-microfluidic device 100 incorporating the principles of partial saturation. Device 100 includes a fluid input portion 102 operably coupled to a first porous element 101. The device 100 further includes a second porous element 110 coupled to the first porous element 101. In the illustrated embodiment, the second porous element 110 interacts with the first porous element 101 in a region between a proximal portion 106 and a distal portion 108 of the first porous element 101. In some embodiments, the first porous element 101 comprises a different material than the second porous element 110. For example, the first porous element 101 can comprise a nitrocellulose membrane and the second porous element 110 can comprise a glass fiber membrane.

Figure 1B:
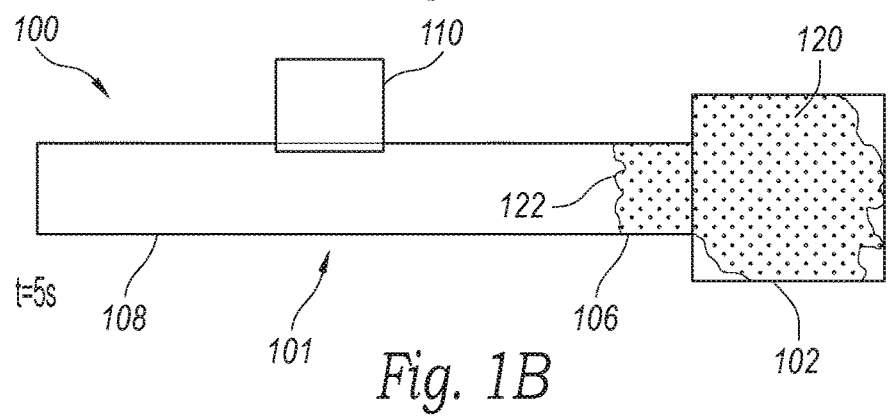
Figure 1C:
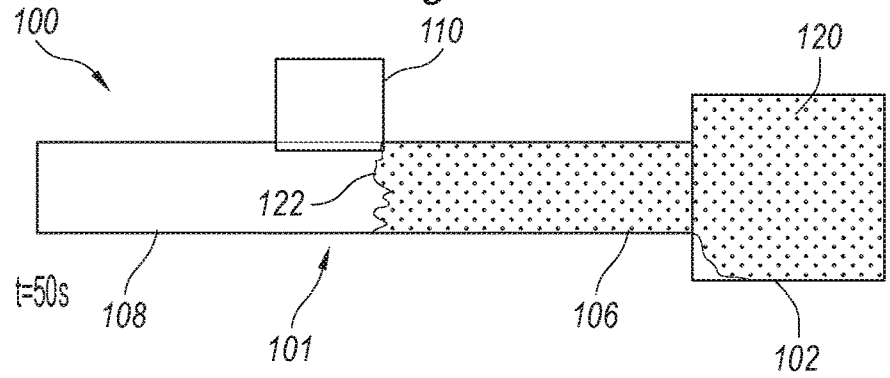
Figure 1D:
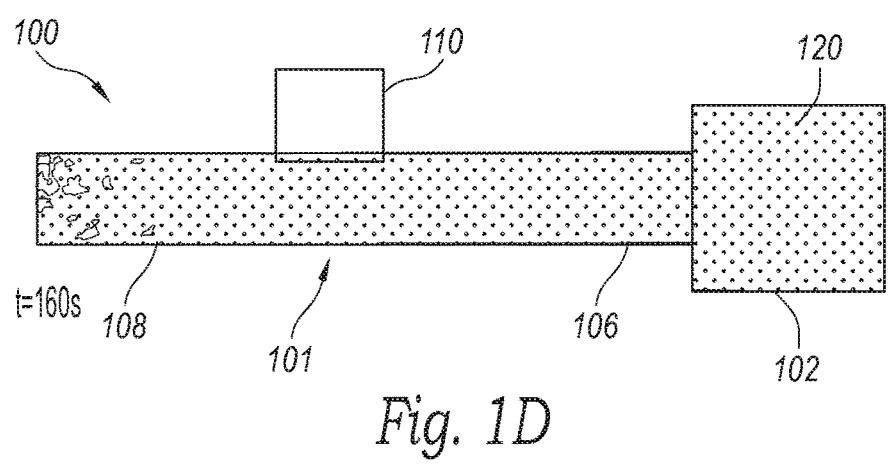
Figure 1E:
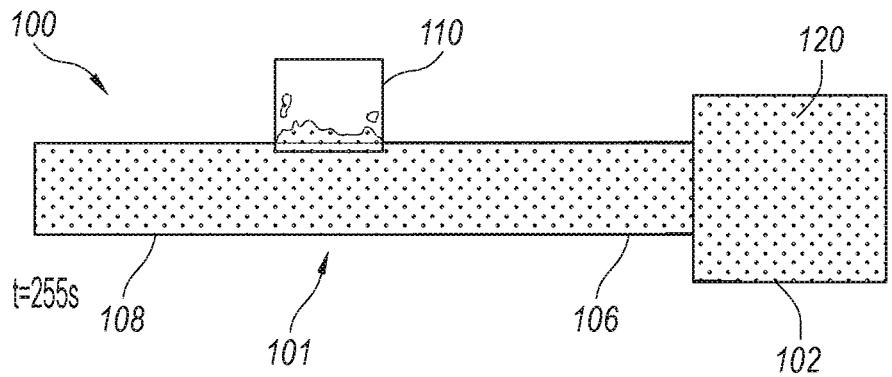
Figure 1F:
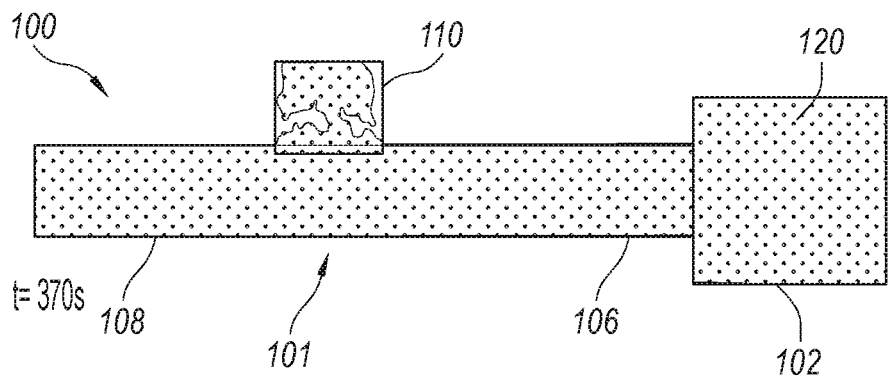
Figure 1G:
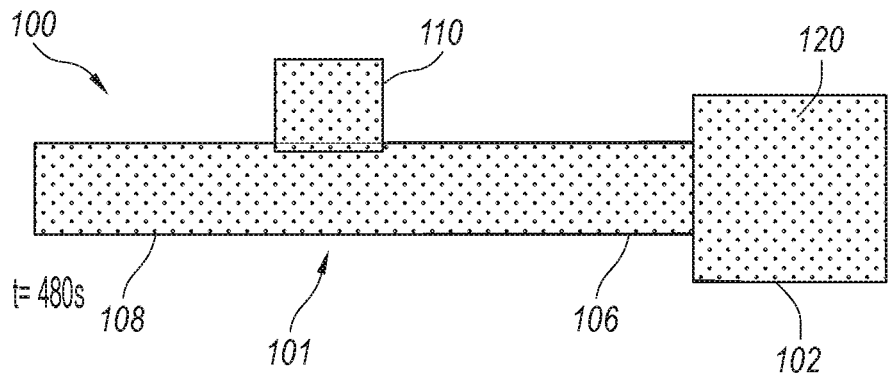

When a fluid sample 120 is added to the fluid input portion 102, capillary pressure drives the fluid 120 into the proximal portion 106 of the first porous element 101 (FIG. 1B). A fluid front 122 continues to advance from the proximal portion 106 to the distal portion 108 of the first porous element 101. Notably, because the first porous element 101 and the second porous element 110 comprise different materials exhibiting different flow characteristics, the fluid 120 flows to the distal portion 108 of the first porous element 101 before wetting the second porous element 110 (FIGS. 1C and 1D). Once the fluid front 122 reaches the distal portion 108 of the first element, the capillary exerted on the fluid 120 is altered, and the fluid 120 can flow into the second porous element 110 (FIGS. 1E-1G). The fluid 120 will flow into the second porous element 110 until the first porous element 101 and the second porous element 110 are fully saturated.

Using Darcy's law to model the flow of fluid through device 100 would incorrectly predict that the fully saturated wetting front would move into the second porous element 110 before reaching the distal portion 108 of the first porous element 101. However, Richards equation accurately predicts the fluid will only enter the second porous element 110 once the partially saturating fluid front 122 reaches the distal portion 108 of the first porous element 101 by incorporating the difference of material, and thus capillary pressures, of the first porous element 101 and the second porous element 110.

III. Select Embodiments of Pressure-Based Microfluidic Elution Devices

Figure 2A:
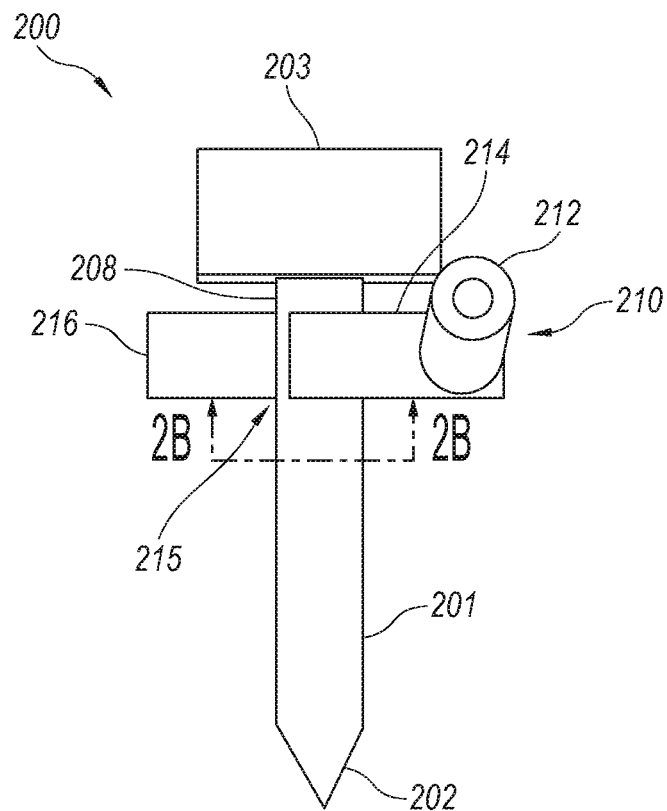
FIGS. 2A-2B illustrate an elution microfluidic device configured in accordance with select embodiments of the present technology.
Figure 2B:
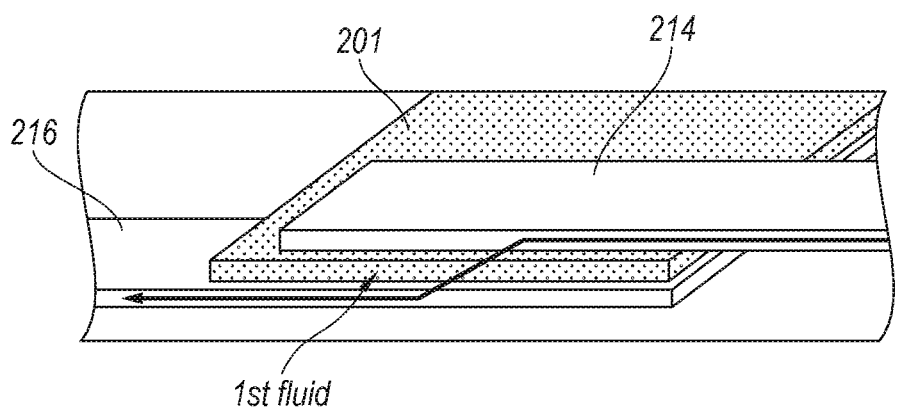

FIG. 2A is a top view of an elution-based microfluidic device 200 configured in accordance with an embodiment of the present technology. As shown in FIG. 2A, the device 200 includes a first porous element 201 and a second porous element 210 positioned across the first porous element 201 such that an overlapping region 215 exists between the first porous element 201 and the second porous element 210. FIG. 2B is an enlarged view of the overlapping region 215 taken along the cross-section indicated in FIG. 2A.

Referring to FIG. 2A, the first porous element 201 includes a proximal portion 202 configured to receive one or more fluids. The proximal portion 202 can optionally be coupled to a separate porous element (not shown), such as a source pad (e.g., glass fiber, nitrocellulose, cellulose, etc.) that is positioned in fluid communication with the first porous element 201 and configured to receive a volume of fluid from a fluid source (e.g., a transfer pipette). The first porous element 201 further includes a distal portion 208 in fluid communication with a waste pad 203. The waste pad 203 is positioned to receive all or a portion of the delivered fluid after it travels through the first porous element 201. In some embodiments, the waste pad 203 can be configured to drive fluid flow from the proximal portion 206 of the first porous element 201 towards the waste pad 203. For example, the waste pad 203 can comprise a material having an appropriate capillary-flow pressure profile to promote fluid flow along the first porous element 201 (e.g., cellulose, nitrocellulose, etc.). In some embodiments, however, the device 200 does not include a waste pad 203.

The second porous element 210 includes a proximal portion 214 and a distal portion 216. The proximal portion 214 can include a separate input region 212 configured to receive and/or release one or more fluids onto the proximal portion 214. In other embodiments, however, the proximal portion 214 does not include a separate input region 212, and fluid can be delivered directly to the proximal portion 214 (e.g., via pipette transfer). As best seen in FIG. 2B, the proximal portion 214 overlaps with the first porous element 201 on a first side of the first porous element 201. The distal portion 216 overlaps with the first porous element 201 on a second side of the first porous element 201 opposite the first side. Accordingly, for a fluid to travel from the proximal portion 214 to the distal portion 216 of the second porous element 210, the fluid must flow through the overlapping region of the first fluid portion, as indicated by the arrow in FIG. 2B.

The overlapping portion of the first porous element 201 and the overlapping portion of the second porous element 210 together define the overlapping region 215. As described above, the proximal portion 214 of the second porous element 210 is positioned on top of and in direct contact with the first porous element 201. As such, the overlapping portion of the first porous element 201 is in fluid communication with the overlapping portion of the proximal portion 214. In other embodiments, the first porous element 201 can be on top of the proximal portion 214 of the second porous element 210. The distal portion 216 of the second porous element 210 is positioned underneath and in direct contact with the first porous element 201. As such, the overlapping portion of the first porous element 201 is also in fluid communication with the overlapping portion of the distal portion 216. In other embodiments, the first porous element 201 can be underneath the distal portion 216 of the second porous element 210.

In some embodiments, the overlapping portions of the first and second porous elements are not in direct contact but are nevertheless configured for fluid communication. For example, a thin separation material or membrane (not shown) can be positioned between the overlapping portions of the first and second membrane. In some embodiments, the separation material can have one or more openings that are sized and shaped to more precisely control the contact between the first and second porous elements 201, 210.

The first porous element 201 and the second porous element 210 can be selected based on their respective flow pressure properties, as exhibited in water retention curves ("WRC"). Suitable materials can include, for example, glass fiber, nitrocellulose, cellulose, etc. In addition to the material used, other variables that affect flow pressure include average pore size and contact angle. In the embodiment shown in FIGS. 2A-2B, the first porous element 201 is made of a first porous material having a first average pore size, and the second porous element 210 is made of a second porous material having a second average pore size greater than the first average pore size. In the embodiment shown in FIG. 2A, for example, the first porous element 201 is made of nitrocellulose, and the second porous element 210 is made of glass fiber. In other embodiments, however, the first and second porous elements 201, 210 can be made of other porous materials so long as the WRC of the second porous element 210 is shifted to the left of the WRC of the first porous element 201.

Figure 3A:
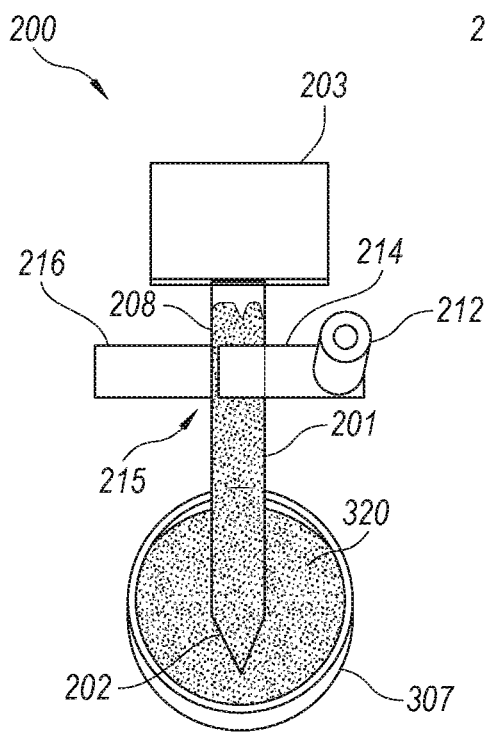
FIGS. 3A-3D are time-lapse views of the microfluidic device of FIGS. 2A-2B during various stages of fluid delivery in accordance with select embodiments of the present technology.
Figure 3B:
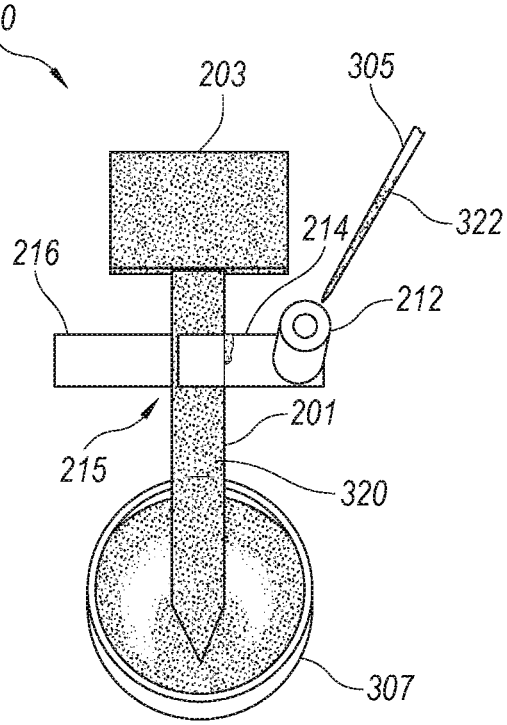

FIGS. 3A-3D are time-lapse views of the elution-based microfluidic device 200 during various stages of fluid delivery. Beginning with FIG. 3A, a first fluid 320 can be added to the input portion 202 of the first porous element 201 (e.g., by placing the input portion 202 into a well 307). The first fluid 320 then begins wicking distally through the first porous element 201 towards the overlapping region 215. Because of the relative flow properties of the first and second porous elements 201, 210 (e.g., the WRC's of the first and second porous elements), the negative fluid pressure magnitude within the overlapping portion 215 is such that the wicking front of the first fluid 320 passes through the overlapping region 215 without wetting (or without substantially wetting) the overlapping portion of the second porous element 210, as shown in FIG. 3B. As used herein, the phrase "without wetting" refers to substantially no transfer of fluid between the first and second porous elements 201, 210. As such, the first fluid 320 will continue to imbibe the first porous element 201 only, thereby leaving the second porous element 210 substantially dry.

Figure 3C:
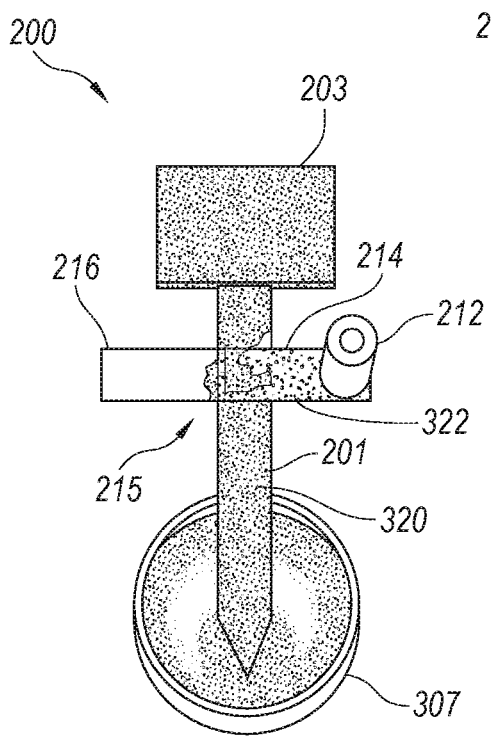
Figure 3D:
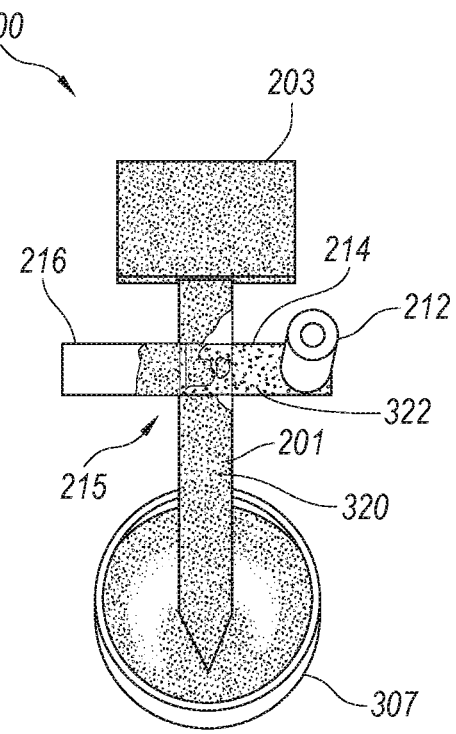

Once the distal portion 208 and/or waste pad 203 of the first porous element 201 becomes sufficiently saturated, a second fluid 322 can be delivered to the input region 212 of the second porous element 210 (e.g., via transfer using a pipette 305). Addition of the second fluid 322 to the second porous element 210 lowers the magnitude of the negative pressure at the overlapping region 215, thereby allowing the second fluid 322 to imbibe distally along the second porous element 210. As shown in FIGS. 3C and 3D, as the second fluid 322 passes through the overlapping region 215, the second fluid 322 mixes with first fluid 320 and pulls a volume of the first fluid 320 distally along the distal portion 216 of the second porous element 210. Additional details of multi-component microfluidic systems configured to elute a captured sample are described in U.S. Patent App. Publication No. 2016/0310942, titled "PRESSURE-BASED CONTROL OF FLUID VOLUMES AND ASSOCIATED DEVICES, SYSTEMS, AND METHODS," the disclosure of which is incorporated by reference herein in its entirety.

IV. Select Embodiments of Pressure-Based Stopped-Flow Microfluidic Devices

Figure 4:
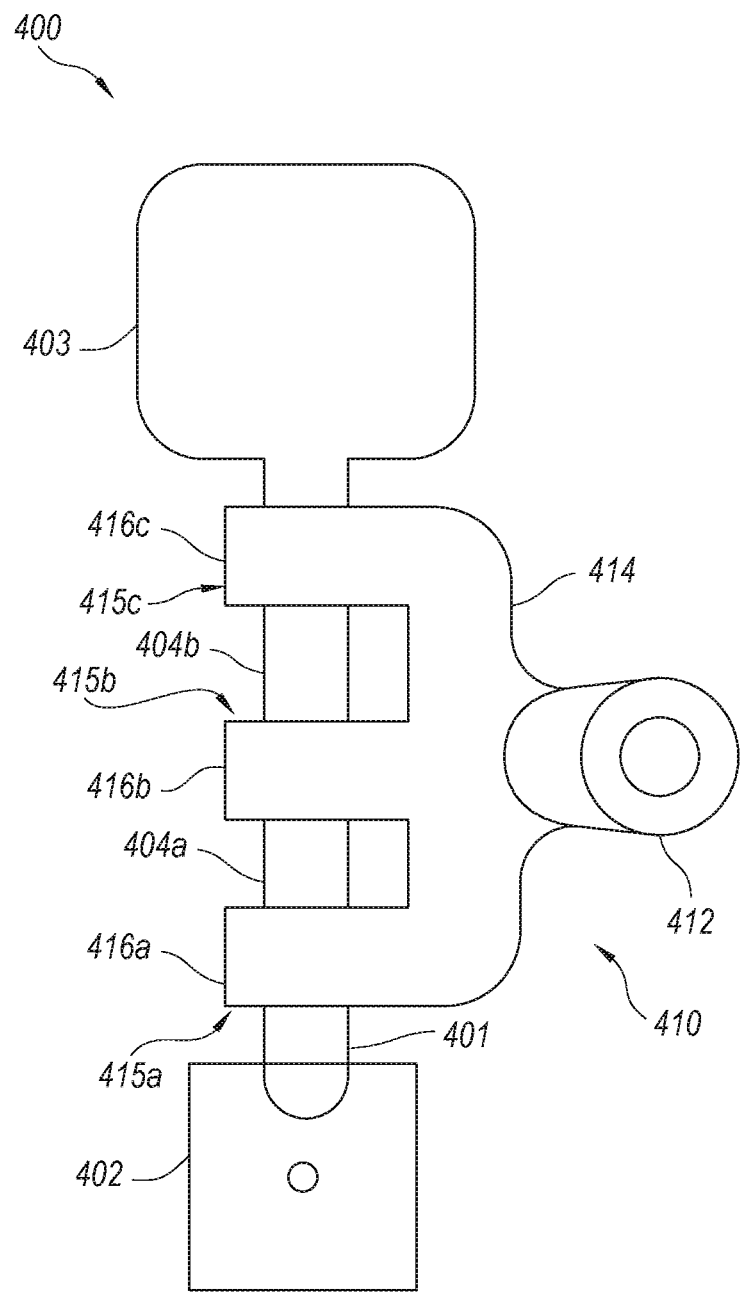
FIG. 4 illustrates a stopped-flow microfluidic device configured in accordance with select embodiments of the present technology.

FIG. 4 illustrates a microfluidic device 400 configured in accordance with select embodiments of the present technology. As illustrated, the device 400 includes a first porous membrane/element 401 and a second porous membrane/element 410. A proximal end of the first porous element 401 is fluidly coupled to a fluid inlet pad 402, which is configured to receive a first fluid. A distal end of the first porous element 401 is fluidly coupled to a waste pad 403. The second porous element 410 includes a body portion 414 and a plurality of legs 416a-c extending from the body portion 414. The second porous element 410 can also have a fluid inlet port 412 configured to receive and/or house a second fluid for delivery to the body portion 414.

The first porous element 401 can comprise any material suitable for lateral flow microfluidic devices. For example, the first porous element 401 can comprise cellulose, nitrocellulose, glass fiber, and/or other materials known in the art. In addition, the first porous element 401 can have various pore sizes and dimensions to affect the flow of fluid therethrough. The first porous element 401 can be configured to receive about 0.1 mL to about 50 mL of first fluid. For example, the first porous element 401 can be configured to receive about 0.1 mL, about 0.5 mL, about 1.0 mL about, about 2.0 mL, about 3.0 mL, about 4.0 mL, about 5.0 mL, about 10 mL, about 20 mL, about 30 mL, about 40 mL, and/or about 50 mL of the first fluid. The first porous element 401 can be fluidly coupled to the fluid inlet pad 402. In some embodiments, the fluid inlet pad 402 is integral with the first porous element 401 and is configured to directly receive a first fluid (e.g., from a pipette or well). In some embodiments, the fluid inlet pad 402 is separate from but fluidly coupled to the first porous element 401. The fluid inlet pad 402 can include a sample port (not shown) for receiving the first fluid. Regardless of the configuration of the fluid inlet pad 402, when a first fluid is added to the fluid inlet pad 402, the first fluid travels distally along the first porous element 401 towards the waste pad 403. As will be described in greater detail below, the first fluid flows from the fluid inlet pad 402 to the waste pad 403 without wetting and/or entering one or more of the plurality of legs 416a-c.

The waste pad 403 can be any structure suitable for receiving fluid from the first porous element 401. For example, the waste pad 403 can be a receiving structure comprising cellulose and/or nitrocellulose that is positioned in fluid communication with the first porous element 401 and capable of receiving fluid flowing through the first porous element 401. In some embodiments, however, the device 400 does not include a separate waste pad 403 and fluid simply flows to a distal end portion of the first porous element 401.

The second porous element 410 can comprise any material suitable for lateral flow microfluidic devices. For example, the second porous element 410 can comprise cellulose, nitrocellulose, glass fiber, and/or other materials known in the art. In addition, the second porous element 410 can have various pore sizes and dimensions to affect the flow of fluid therethrough. In some embodiments, the second porous element 410 comprises a different material than the first porous element 401. In other embodiments, the second porous element 410 comprises the same material as the first porous element 401, but with different characteristics to affect the capillary pressure exerted on the first fluid. In some embodiments, the first porous element 401 and the second porous element 410 can be selected based on their respective flow pressure properties, as exhibited in WRCs. For example, in some embodiments the first porous element 401 is made of a first porous material having a first average pore size, and the second porous element 410 is made of a second porous material having a second average pore size greater than the first average pore size. In some embodiments, the first porous element 401 is made of nitrocellulose, and the second porous element 410 is made of glass fiber. In other embodiments, however, the first and second porous elements 401, 410 can be made of other porous materials so long as the WRC of the second porous element 410 is shifted to the left of the WRC of the first porous element 401.

The second porous element 410 includes a body portion 414. As illustrated, the body portion 414 extends generally parallel to the first porous element 401, although any number of configurations are possible without deviating from the scope of the present technology. A first leg 416a, a second leg 416b, and a third leg 416c extend from the body portion 414 (collectively referred to as the "legs 416a-c"). The legs 416a-c overlap with the first porous element 401 at varying positions along the length of the first porous element 401, thereby creating overlapping portions 415a-c. For example, the illustrated embodiment depicts the legs 416a-c extending over the top of the first porous element 401, although other configurations are possible. For example, in some embodiments, the legs 416a-c extend underneath the first porous element 401 to create the overlapping portions 415a-c. In some embodiments, one or more of the legs 416a-c extend over the top of the first porous element 401 while one or more of the legs 416a-c extend underneath the first porous element 401. In yet other embodiments, one or more of the legs 416a-c do not overlap with the first porous element 401, but rather are fluidly coupled to the first porous element 401 at a distal end of each of the respective legs 416a-c.

As illustrated, the first leg 416a overlaps with a proximal portion of the first porous element 401 (e.g., a first region of the first porous element 401) to form the first overlapping portion 415a, the second leg 416b overlaps with a medial portion of the first porous element 416 (e.g., a third region of the first porous element 401) to form the second overlapping portion 415b, and the third leg 416c overlaps with a distal portion of the first porous element 416 (e.g., a second region of the first porous element 401) to form the third overlapping portion 415c. As a result, the first porous element 401 includes a first intermediate region 404a between the first overlapping portion 415a and the second overlapping portion 415b. Likewise, the first porous element 401 includes a second intermediate region 404b between the second overlapping portion 415b and the third overlapping portion 415c.

In some embodiments, the legs 416a-c are in direct contact with the overlapping portions 415a-c of the first porous element 401. In some embodiments, the legs 416a-c and the overlapping portions 415a-c of the first porous element 401 are not in direct contact but are nevertheless configured for fluid communication. For example, a thin separation material or membrane (not shown) can be positioned between the overlapping portions of the first and second porous elements 401, 410. In some embodiments, the separation material can have one or more openings that are sized and shaped to more precisely control the contact between the first and second porous elements 401, 410.

The legs 416a-c are configured to deliver fluid from the body portion 414 to the overlapping portions 415a-c of the first porous element 401. For example, when a second fluid is released into the fluid inlet port 412, the second fluid flows through the body portion 414 and into the legs 416a-c. As will be described in greater detail below with respect to FIGS. 5A-E, the second fluid flows into the first porous element 401 at the overlapping portions 415a-c.

The legs 416a-c can be integral to the body portion 414 or can otherwise be fluidly coupled to the body portion 414 such that fluid can flow between the body portion 414 and the legs 416a-c. As one skilled in the art will appreciate, the second porous element 410 can include greater or fewer legs 416a-c than depicted in FIG. 4. For example, the second porous element 410 can include one, two, three, four, five, six, seven, eight, or more legs. As will be apparent following the description below, the number of legs can determine the number of regions exhibiting stopped flow along the first porous element 401.

FIGS. 5A-E are time-lapse views of the device 400 following delivery of a first fluid 520 to the fluid inlet pad 402 and a second fluid 522 to the fluid inlet port 412. As illustrated in FIG. 5A-5C, a first fluid 520 is added to the fluid inlet pad 402 fluidly coupled to the first porous element 401. The first fluid 520 flows through the first porous element 401 via capillary flow with a partially saturated wetting front. Due at least in part to the pressure differential between the first porous element 401 and the legs 416a-c, the first fluid 520 does not substantially wet the legs 416a-c as it flows through the plurality of overlapping portions 415a-c. Rather, the wetting front of the first fluid 522 travels distally into the waste pad 403.

Following partial or complete saturation of the waste pad 403 (or at another time deemed appropriate by a user), a second fluid 522 is added to the second porous element 410 via the fluid inlet port 412 (FIG. 5D). The second fluid 522 flows through the body portion 414 and into each leg 416a-c. Unlike the first fluid 520, the pressure exerted on the second fluid 522 permits the second fluid 522 to flow from each of the legs 416a-c into the respective overlapping portions 415a-c of the first porous element 401. In some embodiments, this occurs because, even when the first porous element 401 is wetted by the first fluid 520, the second porous element 410 still exerts a greater pressure on the second fluid 522 than the first porous element 401, and the second fluid 522 simply flows from the higher-pressure legs 416a-c into the lower pressure overlapping portions 515a-c. Accordingly, the second fluid 522 mixes with the first fluid in the first porous element 401 at each of the overlapping portions 415a-c. The mixture of the first fluid 520 and the second fluid 522 slowly expands outward from the overlapping portions 415a-c in both a proximal and distal direction along the first porous element 401 (FIG. 5E).

Following mixture of the second fluid 522 and the first fluid 520 at the overlapping portions 415a-c, the pressure exerted on the first fluid 520 along the intermediate regions 404a and 404b of the first porous element 401 is also altered because there is now equivalent saturation upstream and downstream from the intermediate regions 404a-b. For example, the first fluid 520a within the first intermediate region 404a is no longer subject to the negative capillary pressure drawing the first fluid towards the waste pad 403. Rather, the mixture of the first fluid 520 and the second fluid 522 at the first overlapping portion 515a provides a first flow pressure against the first fluid 520a in the first intermediate region 404a (e.g., pushing the first fluid 520a in a distal direction), while the mixture of the first fluid 520 and the second fluid 522 at the second overlapping portion 515b provides a second flow pressure against the first fluid 520 in the first intermediate region 404a (e.g., pushing the first fluid 520a in a proximal direction). The first and second pressures created at the overlapping portions 415a-b are substantially the same in magnitude but opposite in direction. Accordingly, because substantially equal and opposite flow pressures are exerted on the first fluid 520a in the first intermediate region 404a, the first fluid 520a ceases to flow (e.g., flow is substantially stopped in the first intermediate region 404a). Likewise, the first fluid 520b within the second intermediate region 404b is also no longer subject to the negative capillary pressure drawing the first fluid 520 towards the waste pad 403. Rather, the mixture of the first fluid 520 and the second fluid 522 at the second overlapping portion 415b provides a first flow pressure against the first fluid 520b in the second intermediate region 404b (e.g., pushing the first fluid 520b in a distal direction), while the mixture of the first fluid 520 and the second fluid 522 at the third overlapping portion 515c provides a second flow pressure against the first fluid 520b in the second intermediate region 404b (e.g., pushing the first fluid 520b in a proximal direction). The first and second pressures created at the overlapping portions 415b-c are substantially the same in magnitude but opposing in direction. Accordingly, because substantially equal and opposite flow pressures are exerted on the first fluid 520b in the second intermediate region 404b, the first fluid 520b ceases to flow (e.g., flow is substantially stopped in the second intermediate region 404b). Accordingly, following delivery of the second fluid 522, flow is substantially stopped in the first and second intermediate regions 404a-c. For the same reason, flow is also stopped in the second overlapping portion 415b. Accordingly, the second porous element 410 can act as a flow control element to control the flow of the first fluid 520a along the length of the first porous element 401, with the first leg 416a and the third leg 416c acting as flow control legs and the second leg 416b acting as a reagent delivery leg.

In some embodiments, the first porous element 401 can include a capture zone having one or more immobilized capture molecules. The immobilized capture molecules can be configured to selectively bind one or more components of a biological sample included within the first fluid sample. For example, in one embodiment, the capture molecules can be chitosan configured to selectively bind DNA. In another embodiment, the capture molecules are oligonucleotides complementary to a target nucleic acid sequence. In yet another embodiment, the capture molecules are antibodies or antibody fragments configured to selectively bind specific proteins. As one skilled in the art will appreciate, however, the devices described herein can include any number of capture molecules and, accordingly, the present technology is not limited to the capture molecules expressly discussed herein.

The capture molecules (e.g., the capture zone) can be immobilized on the first porous element 401 at the second overlapping portion 415b. Accordingly, as the first fluid 520 flows distally along the first porous element (FIGS. 5A-C), the first fluid 520 will flow through the capture zone, and target components of the first fluid 520 will be selectively captured and retained at the capture zone. Following capture of the target components at the second overlapping portion 415b, the target components can be amplified, visualized, or otherwise treated or altered.

Figure 6:
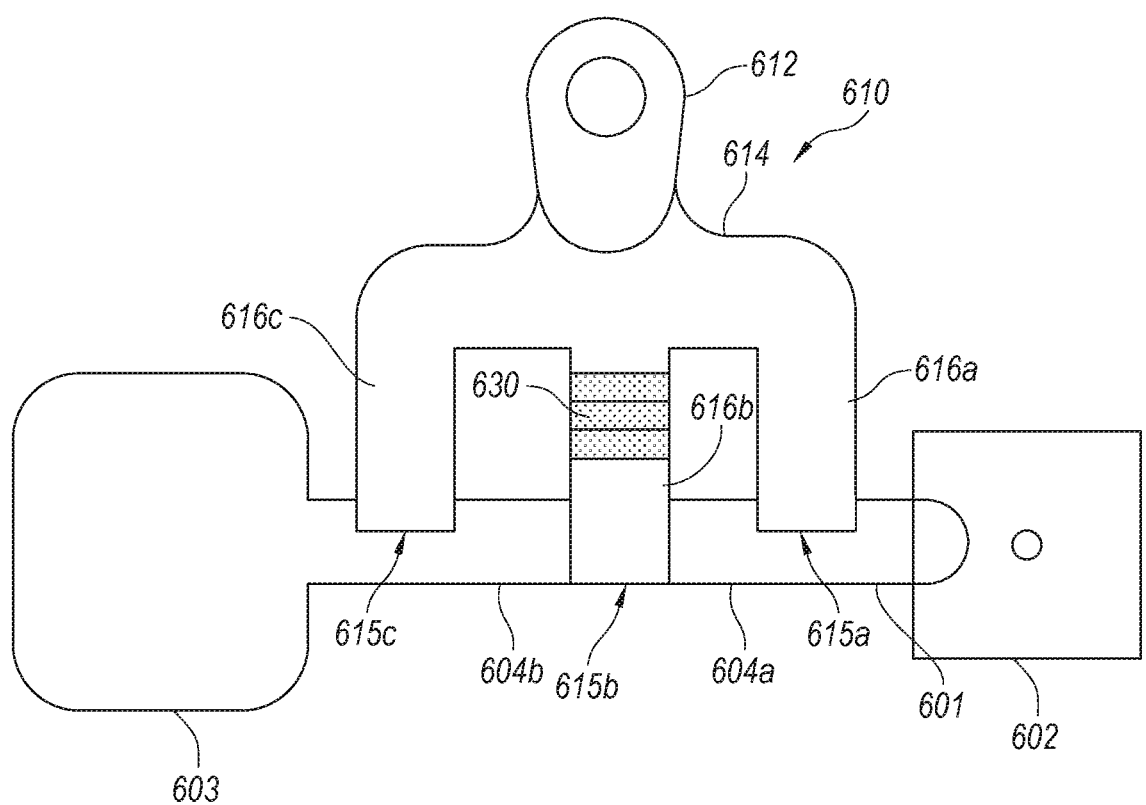
FIG. 6 illustrates another embodiment of a stopped-flow microfluidic device configured in accordance with select embodiments of the present technology.

FIG. 6 illustrates another embodiment of a stopped-flow lateral flow device 600 configured in accordance with the present technology. Device 600 is similar to device 400 in a number of aspects. For example, device 600 includes a first porous element 601 and a second porous element 610. A proximal end of the first porous element 601 is fluidly coupled to a fluid inlet pad 602, which is configured to receive a first fluid. A distal end of the first porous element 601 is fluidly coupled to a waste pad 603. The second porous element 610 includes a body portion 614 and a plurality of legs 616a-c extending from the body portion 614. As illustrated, the first leg 616a partially overlaps with a proximal portion of the first porous element 601 to form the first overlapping portion 615a, the second leg 616b overlaps with a medial portion of the first porous element 616 to form the second overlapping portion 615b, and the third leg 616c partially overlaps with a distal portion of the first porous element 616 to form the third overlapping portion 615c. The first and second legs 616a-b are illustrated as only partially overlapping the first porous element 601, although in some embodiments the first and second legs 616a-b can extend over the full width of the first porous element 601, like the second leg 615b. In yet other embodiments, the second legs a-b do not overlap with the first porous element 601 but are nevertheless in fluid communication with the first porous element 601. The second porous element 610 can also have a fluid inlet port 612 configured to receive or house a second fluid for delivery to the body portion 614. Moreover, the device 600 can include a capture zone at overlapping portion 615b to selectively capture target components of the first fluid.

As illustrated in FIG. 6, the second leg 616b includes dried reaction components 630. In some embodiments, the dried reaction components 630 can be lyophilized reagents (e.g., amplification reagents). The dried reaction components 630 are positioned upstream of the overlapping portion 615b and are configured to be delivered to the overlapping portion 615b to interact with the captured target components.

FIGS. 7A-D are time-lapse views of the device 600 following delivery of a first fluid 620 to the fluid inlet pad 602 and a second fluid 622 to the fluid inlet port 612. Similar to the process described above with respect to FIGS. 5A-5C, a first fluid 720 is added to the fluid inlet pad 602 and flows through the first porous element 601 via capillary flow with a partially saturated wetting front. Due at least in part to the pressure differential between the first porous element 601 and the legs 616a-c, the first fluid 720 does not substantially wet the first legs 616a-c as it flows through the plurality of overlapping regions 615a-c. Rather, the wetting front of the first fluid 720 travels distally into the waste pad 603. However, the target components of the first fluid 720 are selectively retained by the immobilized capture molecules at the second overlapping portion 615b.

Figures 7A, 7B:
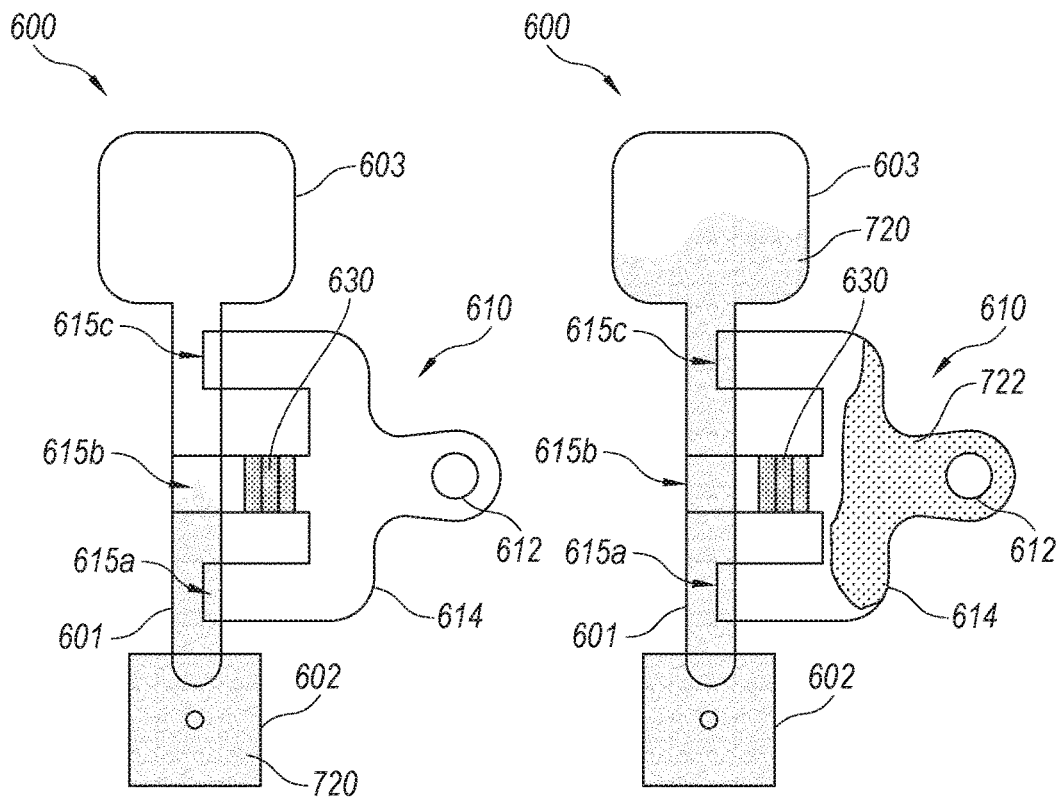
FIGS. 7A-7D are time-lapse views of the microfluidic device of FIG. 6 during various stages of fluid delivery in accordance with select embodiments of the present technology.
Figures 7C, 7D:
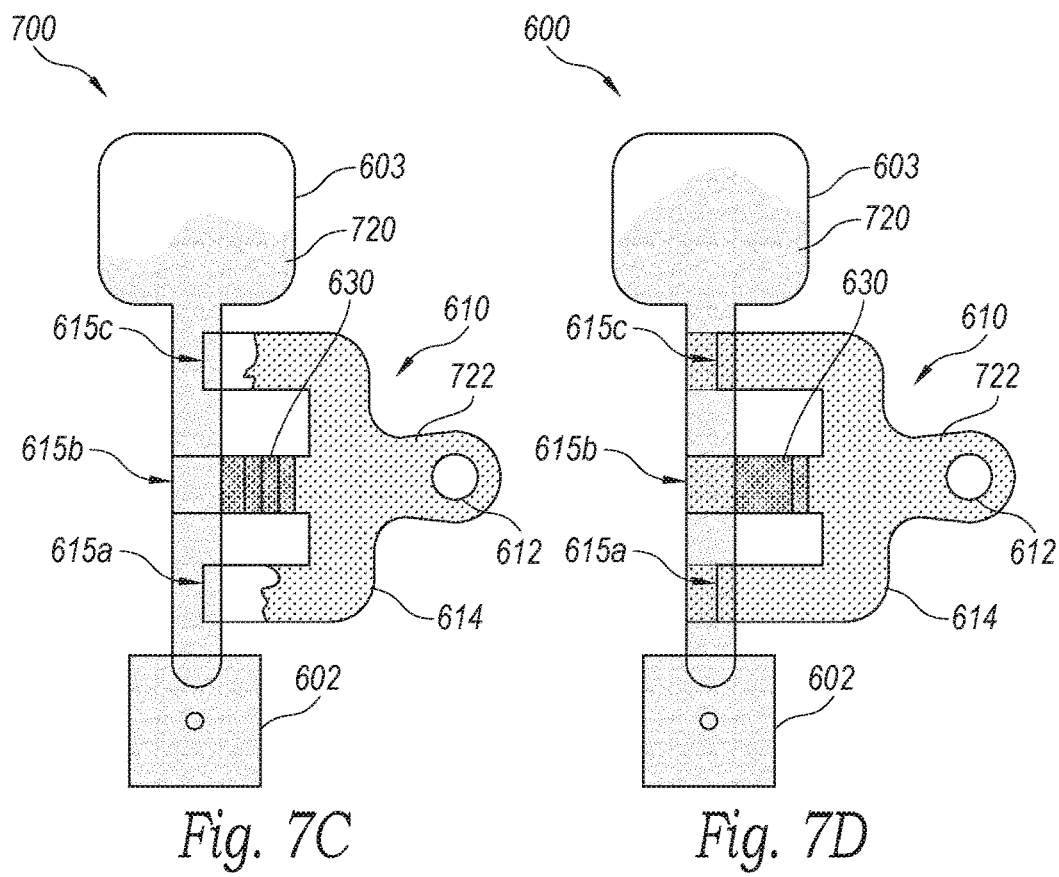

Following partial or complete saturation of the waste pad 603 (or at another time deemed appropriate by a user), a second fluid 722 is added to the second porous element 610 via the fluid inlet port 612 (FIG. 7B). The second fluid 722 flows through the body portion 714 and into each leg 716a-c. As described above, the second fluid 722 flows into the first porous element 601 at the overlapping portions 615a-c and substantially stops flow of the first fluid 720 between the first overlapping portion 615a and the third overlapping portion 615c. However, as the second fluid 722 flows through the second leg 716b, the second fluid 722 rehydrates the dehydrated reaction components 630. The rehydrated reaction components 630 flow with the second fluid 722 and into the second overlapping portion 615b (FIG. 7D). Accordingly, the rehydrated reaction components 630 mix with the immobilized target components retained in the overlapping portion 615b. Moreover, because fluid flow is subsequently stopped along the first intermediate region 704a, the second intermediate region 704b, and the overlapping portion 715b, the reaction components 630 remain adjacent the immobilized target components, thereby facilitating interaction between the reaction components 630 and the immobilized target components.

FIGS. 8A-8C illustrate another embodiment of a stopped-flow lateral device 800 configured in accordance with the present technology. Device 800 can operate in a similar manner as devices 400, 600 described above, except device 800 is configured to automate delivery of the second fluid to the second porous element. Device 800 includes a first porous element 801 and a second porous element 810. A proximal end of the first porous element 801 is fluidly coupled to a fluid inlet pad 802, which is configured to receive a first fluid. A distal end of the first porous element 801 is fluidly coupled to a waste pad 803. The second porous element 810 includes a body portion 814 and a plurality of legs 816a-c extending from the body portion 814. The second porous element 810 can also have a fluid port 812 configured to house a second fluid for delivery to the body portion 814.

Device 800 further includes an automated fluid release mechanism 840. Automated fluid release mechanism 840 is configured to automatically control release of the second fluid from the fluid port 812. Automated fluid release mechanism 840 can include a soluble retention element 842 (e.g., a water-soluble paper loop) and pinching members 841a-b. The soluble retention element 842 can retain the pinching members 841a-b in a first position in which the pinching members 841a-b pinch or otherwise restrict the fluid port 812, thereby preventing delivery of the second fluid housed in the fluid port 812 to the second porous element 810.

The soluble retention element 842 can be fluidly coupled to the waste pad 803. Accordingly, as the first fluid flows distally along the first porous element 801 and into the waste pad 803, the first fluid will also flow into the soluble retention element 842. Following sufficient saturation of the soluble retention element 842, the soluble retention element 842 substantially dissolves and/or weakens such that a force exerted on the soluble retention element 842 by the pinching members 841a-b is sufficient to break the soluble retention element 842. The soluble retention element 842 can be designed to rupture based on a predetermined level of saturation to control when the second fluid will be delivered to the second porous element 810. Following rupture of the soluble retention element 842, the pinching members 841a-b transition to a second position (FIG. 8C). In the second position, the pinching members 841a-b do not pinch or otherwise restrict the fluid port 812, thereby allowing delivery of the second fluid housed in the fluid port 812 to the second porous element 810. Following delivery of the second fluid, the device 800 can operate in a similar manner as described above with respect to devices 600, 800.

Accordingly, device 800 enables further automation of processes performed using the lateral flow devices described herein. For example, device 800 removes the need for a user to manually add the second fluid to the second porous element 810. Rather, a user simply adds the first fluid to the first porous element 801. Delivery of the second fluid to the second porous element 810 is automated, as described above. Accordingly, device 800 can be configured to automatically amplify a target component of a biological sample included within the first fluid without a user having to apply a second fluid.

Figure 9:
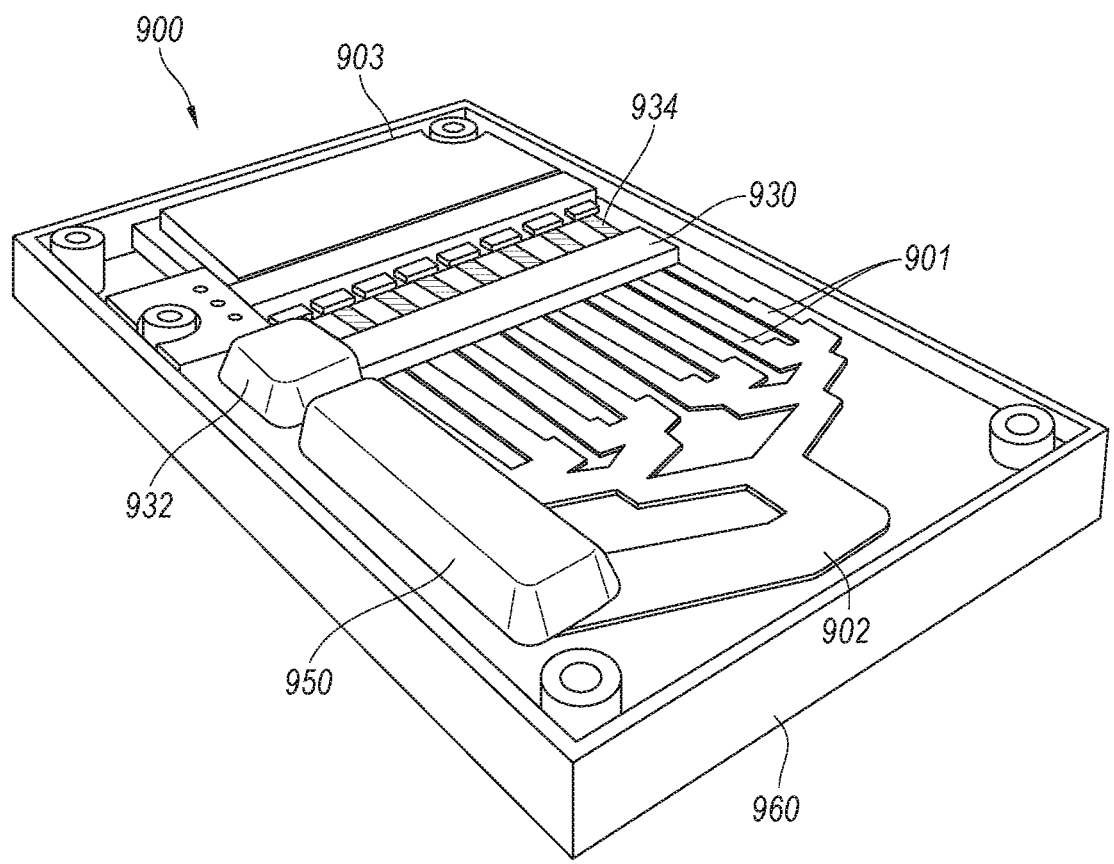
FIG. 9 illustrates a stopped-flow microfluidic device having a plurality of porous networks and configured in accordance with select embodiments of the present technology.

FIG. 9 illustrates another stopped-flow lateral flow device 900 configured in accordance with the present technology. Device 900 can operate in a similar manner as described above with respect to devices 400, 600, 800, except that device 900 is configured to stop flow along a plurality of first porous elements 901, enabling for parallel testing for/amplification of a number of different target components of a first fluid. Device 900 includes a plurality of first porous elements 901 arranged in parallel, a sample input region 902, a rinse buffer well 950 positioned upstream from the plurality of first porous elements 901 and the sample input region 902, a waste pad 903 positioned downstream from the plurality of first porous elements 901, and a second porous element 930. The second porous element 930 extends across the plurality of first porous elements 901 to create a plurality of overlapping regions.

The plurality of first porous elements 901 can include immobilized capture molecules at respective overlapping portions with the second porous element 930. In some embodiments, the immobilized capture molecules can be different for each individual first porous element 901. In other embodiments, the immobilized capture molecules are the same for each individual first porous element 901. Following flow of the first fluid through the plurality of first porous elements 901, the rinse buffer well 950 can release a rinse buffer solution. The rinse buffer solution can flow through the plurality of first porous elements 901, thereby cleansing the capture zones of any unwanted components and preparing the retained target components for subsequent amplification.

The second porous element 930 includes a fluid well 932 configured to retain a rehydration buffer. The second porous element 930 also includes a plurality of legs 934 including dried reaction components (e.g., lyophilized amplification reagents). When the rehydration buffer is released from the fluid well 932, the rehydration buffer flows through the second porous element 930 and into the plurality of legs 934. The rehydration buffer rehydrates the dried reaction components in the plurality of legs 934 and delivers the rehydrated reaction components to the respective overlapping regions of the plurality of first porous elements. Each of the legs 934 can include the same or different reaction components depending on the target components retained in the respective overlapping regions and the desired reaction.

The device 900 can have other components depending on the intended use of the device 900. For example, the device 900 can include electric heaters (not shown) to provide isothermal conditions for amplification. Likewise, the device can be configured to enable real-time fluorescent detection of amplified target components. For example, device 900 can interface with a vacutainer extraction and plasma separation membrane (not pictured) and can use an external reader or cellphone for real-time fluorescent detection. In some embodiments, at least some of the steps performed by device 900 (e.g., release of the rinse buffer solution from the rinse buffer well 950, release of the rehydration buffer solution from the rehydration buffer well 932, etc.) can be automated. Such embodiments can incorporate one or more batteries and electronic control boards to control automated processing (not shown). Device 900 can also be enclosed within an outer casing 960 (cover not shown) configured to protect the device. In some embodiments, device 900 does not include the casing 960.

V. Select Embodiments of Pressure-Based Microfluidic Devices for Automated Dilution The pressure-based microfluidic devices and systems disclosed herein can include intersecting networks of porous elements. For example, fluidic systems of the present technology may include a first porous network comprising one or more first porous elements, and a second porous network comprising one or more second porous elements that intersect of overlap one or more of the first porous elements. Such a configuration, for example, may be utilized for delivering differing quantities of analyte to assay zones arranged in parallel. FIG. 10, for example, shows one embodiment of a microfluidic device 1000 configured for serial dilutions. As shown in FIG. 10, the device 1000 can include a first porous element 1001 configured to receive a first fluid containing a target analyte. The device 1000 further includes a second porous network 1010. The second porous network 1010 includes a body portion 1012 for receiving a second fluid configured to dilute the first fluid sample. The second porous network 1010 can have five porous elements extending from the body portion 1012, each having a proximal leg 1014a-e and a distal leg 1016a-e. A negative control 1014f can optionally be included which delivers no sample. The second porous elements can be positioned on either side of the porous element 1001 to create overlapping regions with the first porous element 10001. As shown in FIG. 10, one or more of the overlapping regions and/or distal and proximal legs 1014a-e, 1016a-e can have the same or different shapes and/or sizes. The porous element(s) of the second porous network 1010 can have a WRC that is shifted to the left of the WRC of the first porous element 1001 to prevent the first fluid from flowing into the legs 1014a-e. For example, in some embodiments, the first porous element 1001 can be nitrocellulose and each of the second porous network 1010 can be glass fiber. The device 1000 further can include a plurality of nitrocellulose test strips 1018*a-f* downstream from the distal legs 1016*a-e* and the optional negative control 1014*f.* A waste pad 1003 can be positioned downstream from the nitrocellulose test strips 1018*a-f.*

FIGS. 11A-B are time-lapse views of the microfluidic device 1000 after a first fluid 1120 has been delivered to the first porous element 1001 and a second fluid 1122 has been delivered to the second porous network 1010. As best illustrated by FIGS. 11C-D, the arrangement of porous elements produces five different concentrations of the first fluid 1120. FIG. 11C is a schematic illustration of the diluted first fluid sample analyte in each of the nitrocellulose test strips 1018*a-f* FIG. 11D is a graph illustrating the normalized pixel intensity corresponding to each of the nitrocellulose test strips 1018*a-f.* As one skilled in the art will appreciate, the number of legs included on the second porous network 1010 can be adjusted depending on the number of desired dilutions.

EXAMPLES

Certain aspects of the present technology, as well as various applications of the present technology, may be better understood with reference to the following examples. The following examples describe specific embodiments of the present technology but in no way limit the scope of the present technology.

Example 1—Suitable Materials for Isothermal Strand Displacement Amplification Using Stopped-Flow Lateral Flow Devices Materials capable of supporting isothermal strand displacement amplification (iSDA) using the devices described herein were screened. Suitable materials were selected that (1) have fluidic properties suitable for dual-porous membrane element device design (e.g., materials with suitable flow rates, capillary pressures, volumetric capacity, etc.), (2) are compatible with protein binders, and (3) support nucleic acid amplification. The iSDA test assay was performed with 10 uL porous membrane squares on Fusion 5, Standard 17, and 8950 glass fiber. These materials meet all assay and flow criteria by exhibiting successful amplification of $10^4$ input copies of gDNA, as illustrated in FIG. 12.

After demonstrating successful iSDA amplification within a membrane with fresh reagents, the "master-mix" of amplification reagents was lyophilized in Standard 17 ("iSDA Pads") with fluorescent probes to enable real-time detection using an inverted fluorescent microscope. FIG. 13 shows real-time amplification data from this system where the primary and secondary membranes are modeled by stationary pads rehydrated by pipette with $10^4$ gDNA template copies. Amplification occurs in approximately 12 minutes, showing that assay kinetics are not significantly hindered in the porous media format. Work extending from these experiments includes integration of the lyophilized iSDA Pads with the devices described herein.

Example 2—iSDA on Porous Membrane Materials

The present technology enables single template immuno-iSDA, which enables the signal amplification of a traditional lateral flow immunoassay (LFIA) through isothermal amplification of a detection-molecule-bound synthetic oligo template. In one example, the present technology incorporates an influenza nucleoprotein (NP) immunoassay, which is visibly detected with streptavidin-coated AuNPs, with biotinylated synthetic oligonucleotide templates and isothermal strand displacement amplification (iSDA). This assay is called "T1" (for single template) immuno-iSDA. FIG. 14 shows a schematic of one potential assay stack for select embodiments of the present technology. The illustrated assay stack comprises capture antibody 1461 immobilized on the porous element 1404 (e.g., HF120), an analyte 1465 (e.g., influenza A recombinant NP), biotinylated detection antibody 1462, streptavidin-coated AuNPs 1464, and biotinylated single-stranded oligonucleotide template 1463 (e.g., mecA template).

The oligonucleotide template 1463 can be based on the sequence of an existing iSDA assay target (e.g., the mecA gene in methicillin-resistant bacteria) and can be amplified to detectable levels with iSDA reagents (e.g., polymerase, nicking enzyme, target-specific primers, and dNTPs with appropriate salts and buffer) when incubated at 50° C. for about 15 min or more. Comparison of in-tube amplification of biotinylated, synthetic, mecA templates and in-tube amplification of genomic DNA that contained the mecA target confirms amplification. For example, FIG. 15 shows the presence of amplification products when oligo template or genomic DNA were added (columns 2 an 3), and the absence of amplification products when they were not added (column 1), using polyacrylamide gel electrophoresis (PAGE) analysis.

Figure 16:
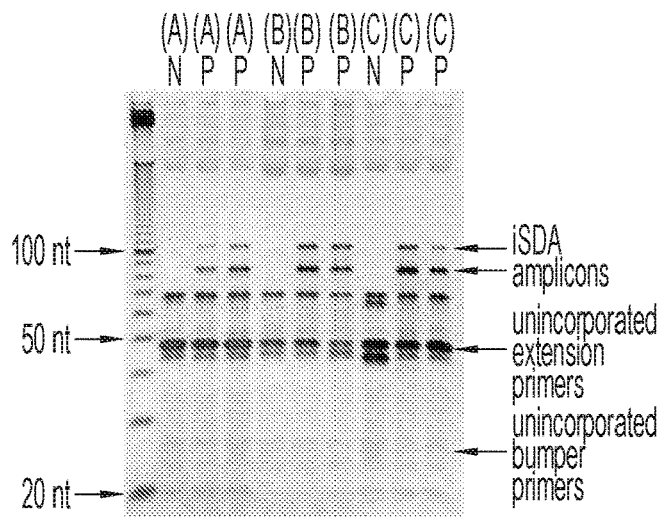
FIG. 16 is an image of the PAGE results following isothermal strand displacement amplification on various porous materials in accordance with select embodiments of the present technology.

Next, the amplification of the biotinylated oligo template by iSDA within the matrix of a first porous member (HF120) and a second porous membrane (Standard 17) was tested. In this embodiment, the materials were rinsed, allowed to dry, pipetted with an iSDA reaction containing $10^8$ copies of biotinylated oligo template, sealed in a hybridization chamber, and incubated at 50° C. for 30 minutes in a clamshell heater. The fluid was then centrifuged out of each material and analyzed by PAGE gel. FIG. 16 shows the PAGE analysis of these iSDA reactions on (a) GF/STD17 blocked by 1% BSA and 0.1% Tween 20 in water (column A), (b) HF120 rinsed by 80 µL of 1% BSA and 0.1% Tween in KiPO$_4$ (column B), and (c) HF120 rinsed with 80 µL of 1% BSA and 0.1% Tween 20 in nuclease-free water (column C). One negative sample (N) and two positive samples (P) were tested for each set up. As illustrated, the incorporation of test with the HF120 and Standard 17 matrices did not substantially affect amplification.

The additional following experimental conditions were used to demonstrate the T1 immuno-iSDA assay. First, the immunoassay capture antibody was hand-spotted on nitrocellulose strips (HF120) at 1 mg/mL and allowed to dry. Next, the nitrocellulose strips were combined with cellulose (C/083) waste pads and placed in successive microplate wells, which contained: (1) nucleoprotein (NP) analyte pre-mixed with detection antibody, (2) streptavidin-coated gold nanoparticle pre-mixed with various amounts of oligonucleotide template, (3) PBS-based wash solution, and (4) KiPO$_4$-based rinse solution. The rinsing step washes away the PBS, which is required for the immunoassay but is not compatible with iSDA. Next, the cellulose waste pads were removed, and glass fiber source pads (GF/8950), which contained iSDA reagent master mixes, were placed on the nitrocellulose strips over the capture region. This assembly was sealed in a hybridization chamber and incubated on a clamshell heater at 50° C. for 30 minutes. Finally, the fluid was centrifuged out of each material and analyzed by PAGE gel. GF/8950 was used because it also supports iSDA reactions and is another glass fiber material that can be incorporated into the present technology.

Figure 17:
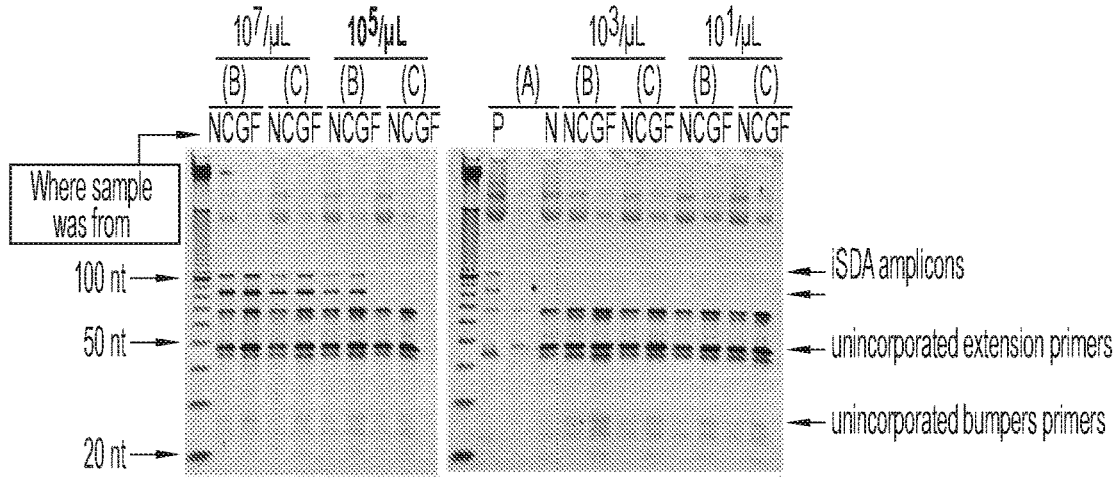
FIG. 17 is an image of the PAGE results following isothermal strand displacement amplification with a full assay stack in accordance with select embodiments of the present technology.

FIG. 17 shows the PAGE gel analysis of this experiment. As illustrated, the use of $10^5$ copies/µL of oligonucleotide template yielded amplification products in the positive NP condition but did not yield amplification products in the negative NP condition. This demonstrates T1 immuno-iSDA in paper, validating one potential use of the devices described herein. FIG. 17 also indicates that the amount of oligo template relative to the amount of analyte can affect assay performance. Relatively too much template ($10^7$ copies/µL) appeared to yield false negatives and relatively too little template ($10^3$ copies/µL) appeared to yield false negatives. However, PAGE analysis is not a highly sensitive detection method. Accordingly, use of more sensitive detection methods, such as LFT and fluorescence detection, can measure signal amplification levels and assay LOD. Thus, embodiments of the devices herein decouple the dependence of captured oligo template on analyte amount, which can significantly increase the dynamic range of the T1 immuno-iSDA assay.

Additional steps that can be incorporated with the methods described herein include, for example: (1) a rinse with $KiPO_4$ to remove PBS after running the immunoassay and before adding iSDA reagents, (2) use of BSA as a blocking agent for the T1 immuno-iSDA, (3) use of Tween-20 in buffers to maintain the wettability of HF120, and (4) manual addition of glass fiber pads (GF/8950) for introducing iSDA reagents to nitrocellulose (HF120) after running the immunoassay.

Example 3—Preparation of Lateral Flow Device for iSDA

A. Reagent Preparation

Reagents were prepared with sterile molecular biology grade water. Low-molecular-weight chitosan oligosaccharide lactate (average MW 5000), Tris base, 2-(N-morpholino)-ethanesulfonic acid (MES), achromopeptidase (ACP, A3547), ethanol, erioglaucine, and glycogen were used. A working solution of chitosan was prepared at 1 mg/mL in 50 mM MES at pH 5. A working solution of erioglaucine was prepared at 2 mg/mL in sterile water. A working solution of ACP was prepared at 20 U/µL in 10 mM Tris, pH 8. The 50 mM MES DNA wash buffer was prepared in sterile water and the pH was adjusted to 5. The 50 mM Tris DNA elution buffer was prepared in sterile water and the pH was adjusted to 9. De-identified human urine samples were provided by the Global Health STI Laboratory at the University of Washington Harborview Medical Center in Seattle, WA, USA. Urine sample pH and salinity was measured using a pH/conductivity meter. The 40 nm InnovaCoat streptavidin-gold conjugates were purchased from InnovaBiosciences (Cambridge, United Kingdom). Triethyl ammonium bicarbonate (TEAB) at 0.1 M was diluted to 75 µM with sterile water. A biotinylated probe (comprising the sequence: 5'-TTTTTTTTTTTTTTTTTTTT-biotinTEG-3; "T20-biotin") was added to the TEAB to create a working solution of T20-biotin probe at 200 µM in 75 µM TEAB. A working solution of gold nanoparticles was prepared using 40 nm, streptavidin-coated, gold nanoparticles diluted to OD 0.0625 in phosphate-buffered saline buffer containing Tween-20 and 1% (w/v) bovine serum albumin (PBST+BSA).

B. Material Fabrication and Patterning

Porous and plastic materials were cut to their final shapes using a $CO_2$ laser. For DNA purification/concentration, Fusion 5 membranes were patterned with chitosan and stored in a desiccator. Glass fiber and cellulose membranes were used without modification. Test cards were made with 0.254 mm-thick Melinex backing with adhesive on one side. For parallel dilution, nitrocellulose membranes (HF135) were patterned with T20-biotin probe by a piezoelectric printer. Glass fiber, Fusion 5, and CFSP223000 cellulose membranes were used without modification. The T20-biotin probe solution was filtered using a 0.2-µm nylon membrane at 8000 g for 5 minutes prior to spotting. Test lines were created by placement of 20 spots, spaced 250 µm apart, with 30 droplets per spot. The volume of each droplet was 450-500 pL. After spotting them with T20-biotin probe solution, the nitrocellulose membranes were UV treated for 8 minutes with a UV transilluminator at 300-310 nm and stored under desiccation before use.

C. Device Configuration

Figure 18:
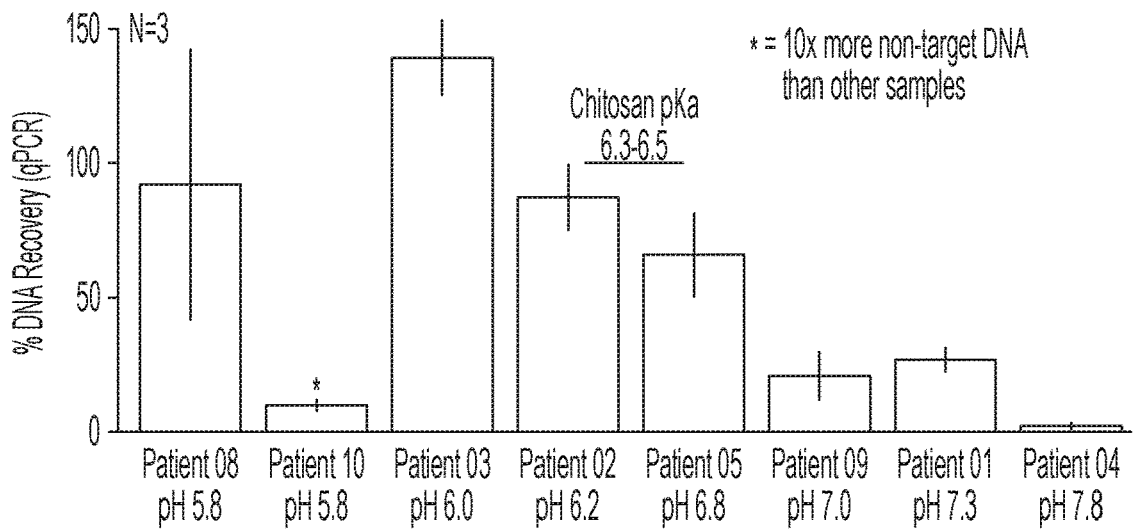
FIG. 18 is a graph of percent DNA recovery for various samples following in-membrane DNA purification and amplification in accordance with select embodiments of the present technology.

Further tests were conducted using devices with Fusion 5 as the primary porous membrane, glass fiber as the secondary porous membrane, and cellulose as the waste pad; and with the membranes held in place by the adhesive layer of the Mylar test card. Device tests were run as previously described, with the following changes. Test samples were prepared as 10 µL of fragmented MRSA gDNA (approximately 104-105 copies/µL) diluted into 990-3,990 µL of either buffer or discarded urine samples for a resulting concentration of approximately 102-103 copies/mL. The full sample volume was then introduced to the upstream end of the first porous membrane of the device and allowed to flow through completely, followed by 250 µL of wash buffer (50 mM MES, pH 5). Next, 250 µL of the elution buffer (50 mM Tris, pH 9) was introduced to the upstream end of the second porous membrane. After the second porous membrane was fully saturated, the chitosan section (e.g., the capture zone) and the elution membrane section were removed from the device. The fluid was recovered from each membrane section by centrifugation at 10,000×g for 3 minutes. The number of copies of target DNA in the fluid recovered from each membrane section was quantified using qPCR, then and adjusted for the volume recovered from each section. FIG. 18 is a graph of the DNA recovery following in-membrane DNA purification and amplification from 1 mL urine samples. Generally, as sample pH increased, recovery of the target DNA decreased (with the exception of patient 10). The non-target DNA in the sample of patient 10 likely overwhelmed the capacity of the DNA purification system leading to poor recovery of target DNA.

Devices were also automated as described above in FIG. 9. The lever arms were set to pinch closed a section of silicone tubing, which was mated to a razor-cut section of a plastic syringe acting as an elution buffer reservoir. A water-soluble membrane looped around laser-cut acrylic lever arms. The entire device was placed over a sample collection well to which the sample was added to initiate the test.

Device automation tests were run with test samples prepared as 10 µL of fragmented MRSA gDNA (approximately 104-105 copies) diluted into 5 mL of buffer (discarded urine samples were not used for these tests) for a resulting concentration of approximately 101-102 copies/mL. In these tests, however, 750 µL of elution buffer (50 mM Tris, pH 9) was loaded into the elution buffer reservoir prior to test initiation. Next, the full volume was added to the sample collection well and allowed to flow through the device without a wash step. The elution buffer automatically released upon sufficient saturation of the waste pads, which enabled sample fluid to traverse the trigger fluid delivery pathway, saturating and dissolving a break in the water-soluble paper loop. After the secondary membrane fully saturated, fluid was recovered from the elution section of the device by centrifugation at 10,000×g for 3 minutes. Recovery of target DNA can be quantified using qPCR results and adjusting for the elution volume.

D. Nucleic Acid Preparation and Quantification

Nucleic acids were purified from 500 µL of discarded urine samples by first harvesting any intact cells by centrifugation at 13,000×g for 3 minutes. The supernatant was saved in a separate tube and cells were resuspended in an equal volume of 10 mM tris at pH 8. Cells were treated with 10 µL of 20 U/µL ACP, incubated at room temperature for 2 minutes, and then heated to 95° C. for 5 minutes. Nucleic acids were purified from both the cell lysate and the supernatant by ethanol precipitation using 1/10 volume of 3 M sodium acetate (pH 5.2), 2 volumes of cold 100% ethanol, and 1/100 volume of 20 mg/mL glycogen. The solutions were mixed by inversion 10-12 times followed by incubation at −20° C. for 15 minutes. After incubation, the samples were centrifuged for 15 minutes at 21,000×g (maximum speed). The glycogen and nucleic acids formed a visible white pellet in the bottom of the tube. The supernatant was removed and the pellet was washed with 1 mL of 70% ethanol. The sample was mixed by inversion 10-12 times followed by centrifugation at maximum speed for 5 minutes. The supernatant was removed and the pellet air-dried for 10 minutes at room temperature. The pellet was then resuspended in 50 µL of sterile water and incubated at 37° C. for 10 minutes. The resulting concentration of nucleic acids was then quantified.

E. MRSA Ldh-1 Gene Quantification

DNA recovery was quantified using a qPCR kit for the ldh-1 gene provided by the ELITechGroup (ELITechGroup Molecular Diagnostics, Bothell, WA, USA). The 20 µL reactions were run on a real-time PCR instrument using the following protocol: 50° C. hold for 2 minutes; 93° C. hold for 2 minutes; 45 cycles of 93° C. for 10 seconds, 56° C. for 30 seconds, and 72° C. for 15 seconds; and 72° C. hold for 5 minutes. Fluorescence data were collected in the Texas Red channel during the 56° C. step of each cycle. The qPCR results were analyzed using the automated threshold cycle (CT) value calculation in the CFX Manager software (Bio-Rad, Hercules, CA, USA), which is sensitive down to approximately $10^1$ copies of the target sequence.

Examples 4-41

Several additional examples of the present technology are set forth in the following examples.

4. A microfluidic device, the device comprising:
a first membrane element having a first end region, a second end region, and a flow region extending between the first end region and the second end region, wherein the first end region is configured to receive a first fluid;
a second membrane element having a fluid input region and one or more legs extending from the fluid input region, wherein each of the one or more legs is fluidly coupled to the fluid input region and the flow region of the first membrane element; and a fluid port in fluid communication with the fluid input region of the second membrane element and configured to receive a second fluid;
wherein the device is configured such that—
delivery of the first fluid to the first end region of the first membrane element causes the first fluid to flow from the first end region of the first membrane element to the second end region of the first membrane element via the flow region without substantially wetting the one or more legs, and
delivery of the second fluid to the fluid port causes the second fluid to flow through (a) the fluid input region, (b) the one or more legs, and (c) at least partially into the flow region of the first membrane element, wherein flow of the second fluid into the flow region changes a flow pressure exerted on the first fluid, thereby substantially stopping flow of the first fluid along at least a portion of the flow region.

5. The microfluidic device of example 4 wherein the one or more legs includes a first flow control leg and a second flow control leg, and wherein the first flow control leg is fluidly coupled to the flow region at a first position and the second flow control leg is fluidly coupled to the flow region at a second position downstream from the first position.

6. The microfluidic device of example 5 wherein delivery of the second fluid to the fluid port causes flow of the first fluid to stop between the first flow control leg and the second flow control leg.

7. The microfluidic device of examples 5 or 6 wherein the flow region includes a capture region having immobilized capture molecules configured to selectively adhere a component of a biological sample included within the first fluid.

8. The microfluidic device of example 7 wherein the immobilized capture molecules are configured to selectively bind one or more target proteins or nucleic acids.

9. The microfluidic device of examples 7 or 8 wherein the capture region is positioned between the first position and the second position.

10. The microfluidic device of any one of examples 5-9 wherein the one or more legs further comprise a reagent delivery leg, and wherein the reagent delivery leg is configured to deliver reagents to the capture region.

11. The microfluidic device of example 10 wherein the reagent delivery leg is fluidly connected to the flow region at or adjacent the capture region.

12. The microfluidic device of examples 10 or 11 wherein the reagent delivery leg includes a dried reagent pad upstream of the fluid connection to the flow region.

13. The microfluidic device of example 10 wherein flow of the second fluid through the reagent delivery leg rehydrates the reagents in the dried reagent pad and delivers the reagents to the capture region.

14. The microfluidic device of any one of examples 10-13 wherein the reagents include nucleic acid amplification reagents.

15. The microfluidic device of any one of examples 4-14 wherein the second fluid is a buffer solution.

16. The microfluidic device of any one of examples 4-15, further comprising a soluble valve component coupled to the second end region of the first membrane element, wherein, in an intact state, the soluble valve component prevents the fluid port from delivering the second fluid to the second membrane element, and wherein, when the soluble valve component is in a dissolved and/or non-intact state, the fluid port delivers the second fluid to the second membrane element.

17. The microfluidic device of any one of examples 4-16 wherein the second membrane element has a greater flow resistance than the first membrane element.

18. The microfluidic device of any one of examples 4-17 wherein the second membrane element comprises glass fiber.

19. The microfluidic device of any one of examples 4-18 wherein the first membrane element is configured to receive from about 0.1 mL to about 50 mL of the first fluid.

20. A microfluidic device, the device comprising:
- a porous flow element having a first end region, a second end region, and a flow region extending between the first end region and the second end region, wherein the first end region is configured to receive a first fluid, and wherein the porous flow element is configured to drive flow of the first fluid through the flow region and towards the second end region; and
- a flow control element having a fluid input region and one or more legs extending from the fluid input region, wherein the fluid input region is configured to receive a second fluid, and wherein each of the one or more legs is configured to deliver the second fluid to one or more sections of the flow region to at least partially stop flow of the first fluid along a segment of the flow region.

21. The microfluidic device of example 20 wherein the one or more legs includes a first flow control leg and a second flow control leg, and wherein the first flow control leg is configured to deliver the second fluid to a first section of the flow region and the second flow control leg is configured to deliver the second fluid to a second section of the flow region downstream from the first section.

22. The microfluidic device of example 21 wherein the flow control element is configured to stop flow of the first fluid between the first and second sections.

23. The microfluidic device of any one of examples 20-22 wherein the flow region includes a capture region having immobilized capture molecules configured to selectively adhere a component of a biological sample included within the first fluid.

24. The microfluidic device of example 23 wherein the immobilized capture molecules are configured to selectively bind to one or more target proteins or nucleic acids.

25. The microfluidic device of examples 23 or 24, wherein the capture region is between the first section and the second section.

26. The microfluidic device of any one of examples 20-25 wherein the one or more legs further comprise a reagent delivery leg, and wherein the reagent delivery leg is configured to deliver reagents to the capture region.

27. The microfluidic device of example 26 wherein the reagents include nucleic acid amplification reagents.

28. The microfluidic device of any one of examples 20-27 wherein the device is configured to automatically deliver the second fluid to the flow control element following a predetermined saturation of the porous flow element.

29. The microfluidic device of any one of examples 20-28 wherein the porous flow element is configured to receive from about 0.1 mL to about 50 mL of the first fluid.

30. A microfluidic device, comprising:
- a first membrane component having—
  - a first fluid input,
  - a waste pad, and
  - a porous flow element extending between the first fluid input and the waste pad and having a first region, a second region, and a third region between the first region and the second region,
  - wherein the first membrane component is configured such that, following delivery of a first fluid to the first fluid input, the first fluid flows through the porous flow element towards the waste pad; and
- a second membrane component having—
  - a second fluid input,
  - a first leg connecting the second fluid input to the first region of the porous flow element, and
  - a second leg connecting the second fluid input to the second region of the porous flow element,
  - wherein the second membrane is configured such that—
    - following delivery of a second fluid to the second fluid input region, the second fluid flows into the first region of the porous flow element via the first leg and into the second region of the porous flow element via the second leg, and
    - flow of the second fluid into the first region and the second region substantially stops flow of the first fluid at the third region of the porous flow element.

31. The microfluidic device of example 30 wherein the third region is a capture region having immobilized capture molecules configured to selectively adhere a component of a biological sample included within the first fluid.

32. The microfluidic device of examples 30 or 31 wherein the second membrane component further comprises a third leg connecting the second fluid input to the third region of the porous flow element.

33. The microfluidic device of example 32 wherein the third leg is configured to deliver one or more reagents to the third region of the porous flow element.

34. The microfluidic device of any one of examples 30-33 wherein the device is configured to amplify components bound to the immobilized capture molecules.

35. The microfluidic device of any one of examples 30-34 wherein the device is configured to optically display components bound to the immobilized capture molecules.

36. A method for controlling fluid flow through a fluidic network including a first flow membrane and a second flow membrane, wherein the second flow membrane includes a first leg and a second leg, the method comprising:
- delivering a first fluid to a proximal portion of the first flow membrane, wherein, following delivery of the first fluid, the first fluid flows from the proximal portion of the first flow membrane to a distal portion of the first flow membrane without substantially wetting the second flow membrane; and
- delivering a second fluid to a fluid input region of the second flow membrane, wherein, following delivery of the second fluid, the second fluid (a) flows into a first region of the first flow membrane via the first leg, and (b) flows into a second region of the first flow membrane via the second leg,
- wherein following delivery of the second fluid, flow of the first fluid between the first region and the second region is substantially stopped.

37. The method of example 36, further comprising capturing a target component of a biological sample included in the first fluid at a third region of the first flow membrane, wherein the third region is between the first region and the second region.

38. The method of example 37, further comprising delivering amplification reagents to the third region.

39. The method of example 38 wherein:
- the second flow membrane includes a third leg connected to the third region,
- the third leg includes dried amplification reagents, and
- delivering the second fluid to the fluid input region causes the second fluid to flow through the third leg, rehydrate the dried amplification reagents, and deliver the rehydrated amplification reagents to the third region.

40. The method of any of examples 37-39, further comprising amplifying the captured target component.

41. The method of any of examples 37-40 wherein the target component is a target nucleic acid.

CONCLUSION

The above detailed description of embodiments of the technology are not intended to be exhaustive or to limit the technology to the precise forms disclosed above. Although specific embodiments of, and examples for, the technology are described above for illustrative purposes, various equivalent modifications are possible within the scope of the technology as those skilled in the relevant art will recognize. For example, although steps are presented in a given order, alternative embodiments may perform steps in a different order. The various embodiments described herein may also be combined to provide further embodiments.

From the foregoing, it will be appreciated that specific embodiments of the technology have been described herein for purposes of illustration, but well-known structures and functions have not been shown or described in detail to avoid unnecessarily obscuring the description of the embodiments of the technology. Where the context permits, singular or plural terms may also include the plural or singular term, respectively.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. As used herein, the phrase "and/or" as in "A and/or B" refers to A alone, B alone, and A and B. Additionally, the term "comprising" is used throughout to mean including at least the recited feature(s) such that any greater number of the same feature and/or additional types of other features are not precluded.

Where a range of values is provided, it is understood that each intervening value, to the tenth of the unit of the lower limit unless the context clearly dictates otherwise, to between the upper and lower limits of that range is also specifically disclosed. Each smaller range between any stated value or intervening value in a stated range and any other stated or intervening value in that stated range is encompassed within the disclosure. The upper and lower limits of these smaller ranges may independently be included or excluded in the range, and each range where either, neither, or both limits are included in the smaller ranges is also encompassed within the disclosure, subject to any specifically excluded limit in the stated range. Where the stated range includes one or both of the limits, ranges excluding either or both of those included limits are also included in the disclosure.

It will also be appreciated that specific embodiments have been described herein for purposes of illustration, but that various modifications may be made without deviating from the technology. Further, while advantages associated with some embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

We claim:

1. A microfluidic device, the device comprising:
   a first membrane element having a first end region, a second end region, and a flow region extending between the first end region and the second end region, wherein the first end region is configured to receive a first fluid;
   a second membrane element having a fluid input region and one or more legs extending from the fluid input region, wherein each of the one or more legs is fluidly coupled to the fluid input region and the flow region of the first membrane element; and
   a fluid port in fluid communication with the fluid input region of the second membrane element and configured to receive a second fluid;
   wherein the device is configured such that—
   delivery of the first fluid to the first end region of the first membrane element causes the first fluid to flow from the first end region of the first membrane element to the second end region of the first membrane element via the flow region without wetting the one or more legs, and delivery of the second fluid to the fluid port causes the second fluid to flow through (a) the fluid input region, (b) the one or more legs, and (c) at least partially into the flow region of the first membrane element, wherein flow of the second fluid into the flow region changes a flow pressure exerted on the first fluid, thereby resulting in zero flow of the first fluid along at least a portion of the flow region.

2. The microfluidic device of claim 1 wherein the one or more legs includes a first flow control leg and a second flow control leg, and wherein the first flow control leg is fluidly coupled to the flow region at a first position and the second flow control leg is fluidly coupled to the flow region at a second position downstream from the first position.

3. The microfluidic device of claim 2 wherein delivery of the second fluid to the fluid port causes flow of the first fluid to stop between the first flow control leg and the second flow control leg.

4. The microfluidic device of claim 2, wherein the flow region includes a capture region having immobilized capture molecules configured to selectively adhere a component of a biological sample included within the first fluid.

5. The microfluidic device of claim 4 wherein the immobilized capture molecules are configured to selectively bind one or more target proteins or nucleic acids.

6. The microfluidic device of claim 4, wherein the capture region is positioned between the first position and the second position.

7. The microfluidic device of claim 2, wherein the one or more legs further comprise a reagent delivery leg, and wherein the reagent delivery leg is configured to deliver reagents to the capture region.

8. The microfluidic device of claim 7 wherein the reagent delivery leg is fluidly connected to the flow region at or adjacent the capture region.

9. The microfluidic device of claim 7, wherein the reagent delivery leg includes a dried reagent pad upstream of the fluid connection to the flow region.

10. The microfluidic device of claim 7 wherein flow of the second fluid through the reagent delivery leg rehydrates the reagents in the dried reagent pad and delivers the reagents to the capture region.

11. The microfluidic device of claim 7, wherein the reagents include nucleic acid amplification reagents.

12. The microfluidic device of claim 1, wherein the second fluid is a buffer solution.

13. The microfluidic device of claim 1, further comprising a soluble valve component coupled to the second end region of the first membrane element, wherein, in an intact state, the soluble valve component prevents the fluid port from delivering the second fluid to the second membrane element, and wherein, when the soluble valve component is in a dissolved and/or non-intact state, the fluid port delivers the second fluid to the second membrane element.

14. The microfluidic device of claim 1, wherein the second membrane element has a greater flow resistance than the first membrane element.

15. The microfluidic device of claim 1, wherein the second membrane element comprises glass fiber.

16. The microfluidic device of claim 1, wherein the first membrane element is configured to receive from about 0.1 mL to about 50 mL of the first fluid.

17. A microfluidic device, comprising:
a first membrane component having—
a first fluid input,
a waste pad, and
a porous flow element extending between the first fluid input and the waste pad and having a first region, a second region, and a third region between the first region and the second region,
wherein the first membrane component is configured such that, following delivery of a first fluid to the first fluid input, the first fluid flows through the porous flow element towards the waste pad; and
a second membrane component having—
a second fluid input,
a first leg connecting the second fluid input to the first region of the porous flow element, and
a second leg connecting the second fluid input to the second region of the porous flow element,
wherein the second membrane is configured such that—
following delivery of a second fluid to the second fluid input region, the second fluid flows into the first region of the porous flow element via the first leg and into the second region of the porous flow element via the second leg, and
flow of the second fluid into the first region and the second region, thereby resulting in zero flow of the first fluid at the third region of the porous flow element.

18. The microfluidic device of claim 17, wherein the third region is a capture region having immobilized capture molecules configured to selectively adhere a component of a biological sample included within the first fluid.

19. The microfluidic device of claim 17, wherein the second membrane component further comprises a third leg connecting the second fluid input to the third region of the porous flow element.

20. The microfluidic device of claim 19, wherein the third leg is configured to deliver one or more reagents to the third region of the porous flow element.

21. The microfluidic device of claim 18, wherein the device is configured to amplify components bound to the immobilized capture molecules.

22. The microfluidic device of claim 18, wherein the device is configured to optically display components bound to the immobilized capture molecules.

* * * * *